(12) United States Patent
Tomcak et al.

(10) Patent No.: US 10,897,914 B1
(45) Date of Patent: Jan. 26, 2021

(54) AUTOMATIC CHINE SAW

(71) Applicant: Tyson Foods, Inc., Springdale, AR (US)

(72) Inventors: Jason William Tomcak, Jefferson, SD (US); Bradley John Dirkschneider, Sioux City, IA (US)

(*) Notice: Subject to any disclaimer, the term of this patent is extended or adjusted under 35 U.S.C. 154(b) by 603 days.

(21) Appl. No.: 15/725,066

(22) Filed: Oct. 4, 2017

(51) Int. Cl.
 *A22C 17/00* (2006.01)
 *A22C 17/02* (2006.01)

(52) U.S. Cl.
 CPC ............ *A22C 17/02* (2013.01); *A22C 17/004* (2013.01); *A22C 17/0086* (2013.01); *A22C 17/0093* (2013.01)

(58) Field of Classification Search
 CPC .......... A22C 17/00; A22C 17/02; A22C 25/16
 USPC ................................. 452/135, 151, 161, 162
 See application file for complete search history.

(56) References Cited

U.S. PATENT DOCUMENTS

| | | | |
|---|---|---|---|
| 2,444,050 A | 6/1948 | Knowlton et al. | |
| 3,748,146 A | 7/1973 | Anderson et al. | |
| 6,322,437 B1 * | 11/2001 | Grabau | A22C 25/16 452/161 |
| 6,547,658 B2 | 4/2003 | Boody et al. | |
| 2005/0085176 A1 | 4/2005 | Houtz | |
| 2010/0130114 A1 | 5/2010 | Bolte et al. | |
| 2010/0304652 A1 | 12/2010 | Bolte et al. | |
| 2014/0227953 A1 * | 8/2014 | Kowalski | A22C 25/16 452/135 |
| 2015/0044955 A1 * | 2/2015 | Kowalski | A22C 25/16 452/135 |
| 2016/0073647 A1 * | 3/2016 | Jurs | A22C 25/12 452/135 |
| 2016/0106112 A1 | 4/2016 | Dunivan | |

FOREIGN PATENT DOCUMENTS

| | | |
|---|---|---|
| CA | 2706407 A1 | 11/2010 |
| WO | 2007041590 A1 | 4/2007 |
| WO | 2013173877 A1 | 11/2013 |

* cited by examiner

*Primary Examiner* — Richard T Price, Jr.
(74) *Attorney, Agent, or Firm* — Greensfelder, Hemker & Gale, P.C.; Mark E. Stallion

(57) ABSTRACT

A system and method for removing a bone from a primal or sub primal meat cut that includes a conveyance system having a continuous conveyor extending along a path of conveyance from an upstream point at the loading end to a downstream point at the discharge. The system includes a pair of opposing support surfaces projecting vertically upward from a first position of the continuous conveyor along the path of conveyance whereby each of the opposing support surfaces of the pair inwardly extend one toward the other, from an upper level downward vertically to a lower level. Each opposing support surface of the pair has a downward slope and each opposing surface of the pair converges at a recessed valley at the lower level.

24 Claims, 19 Drawing Sheets

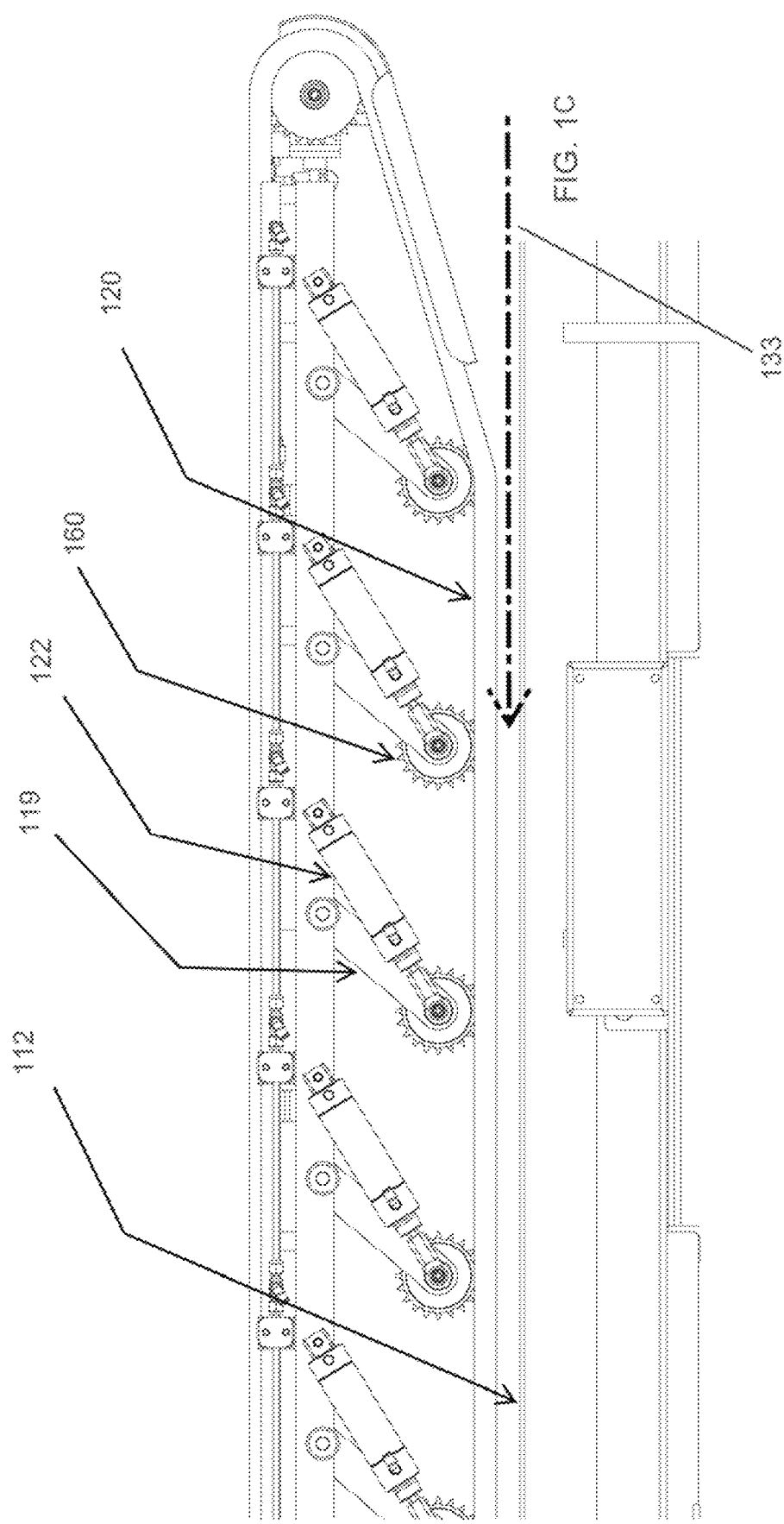

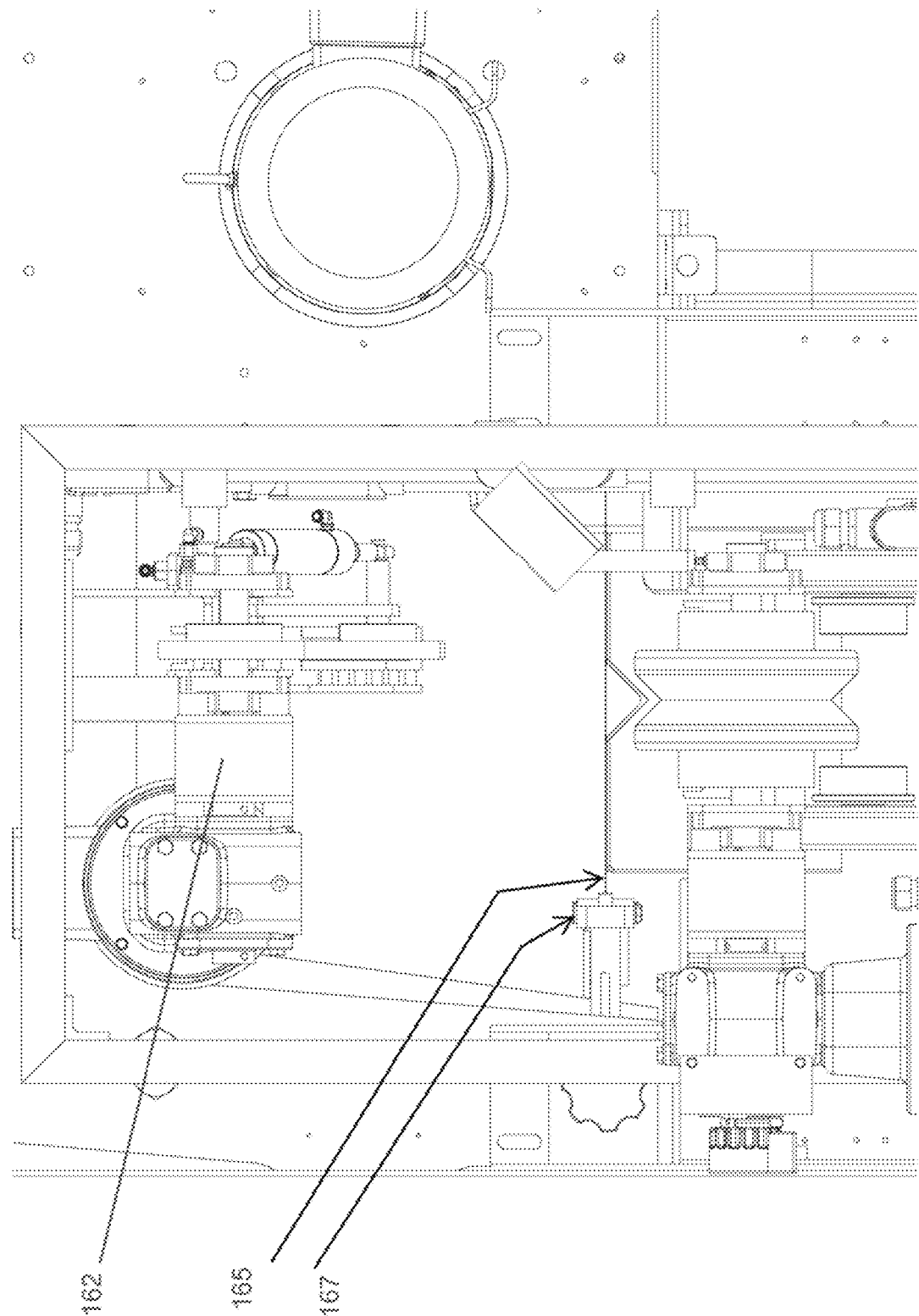

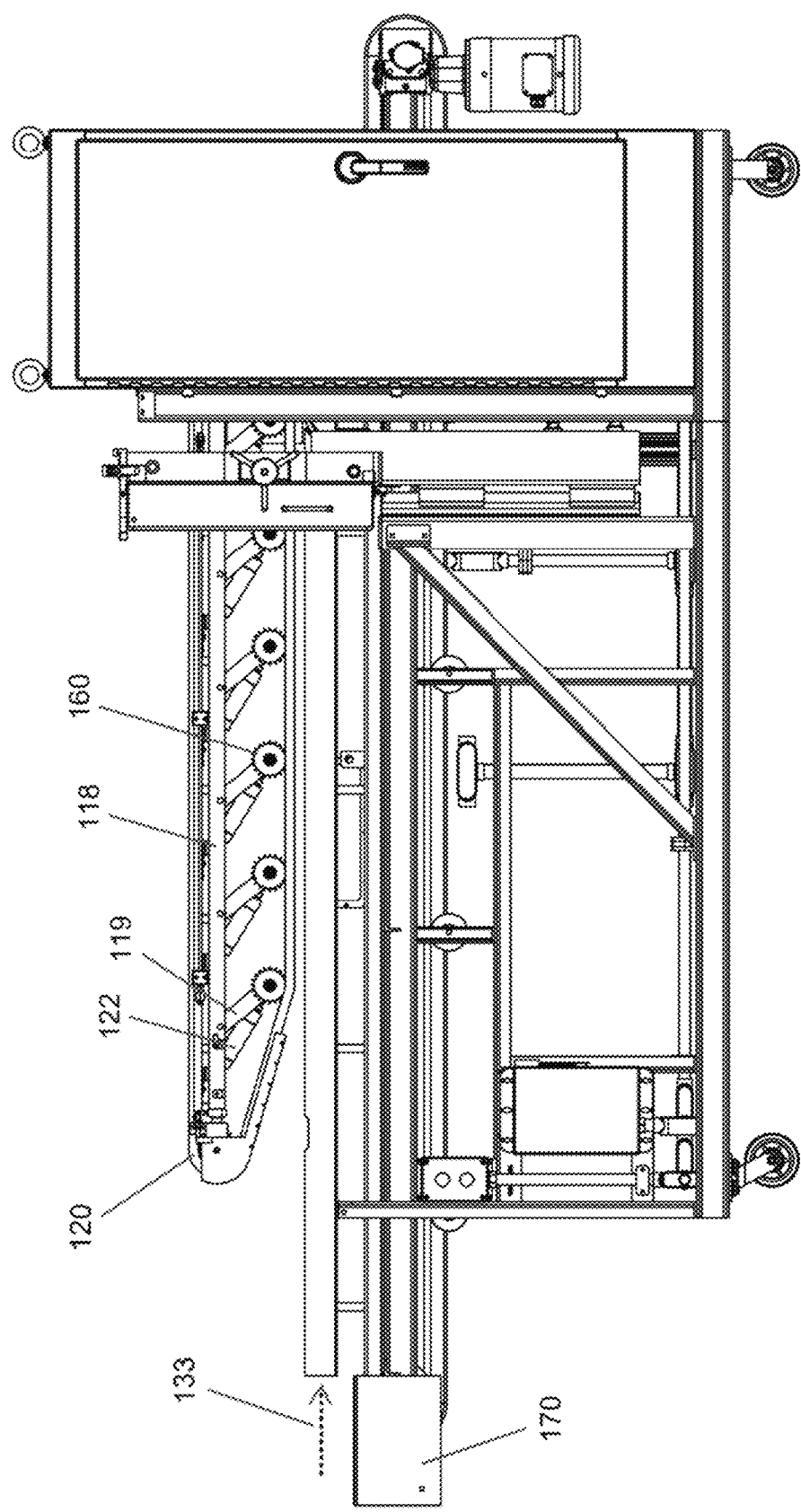

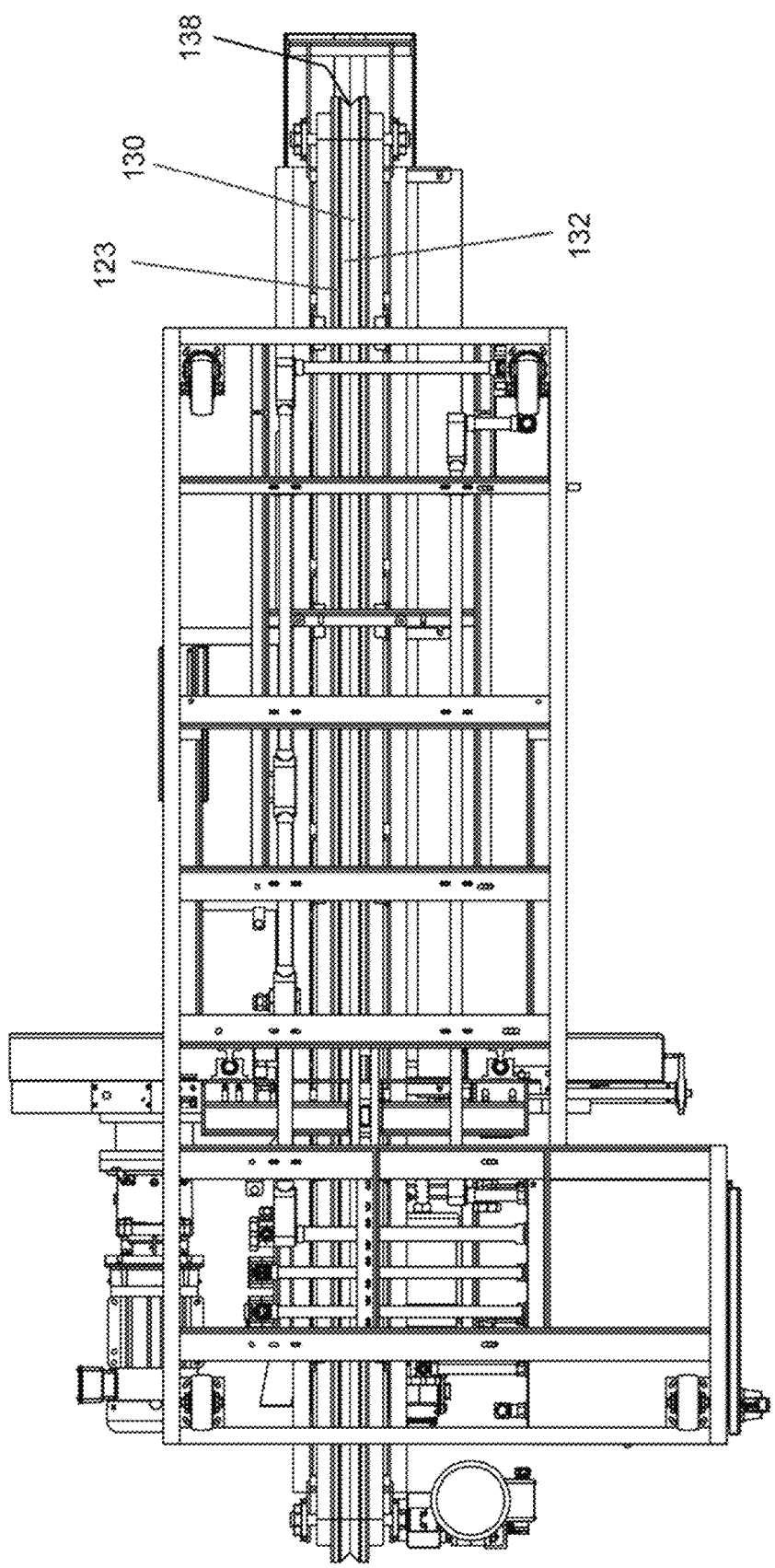

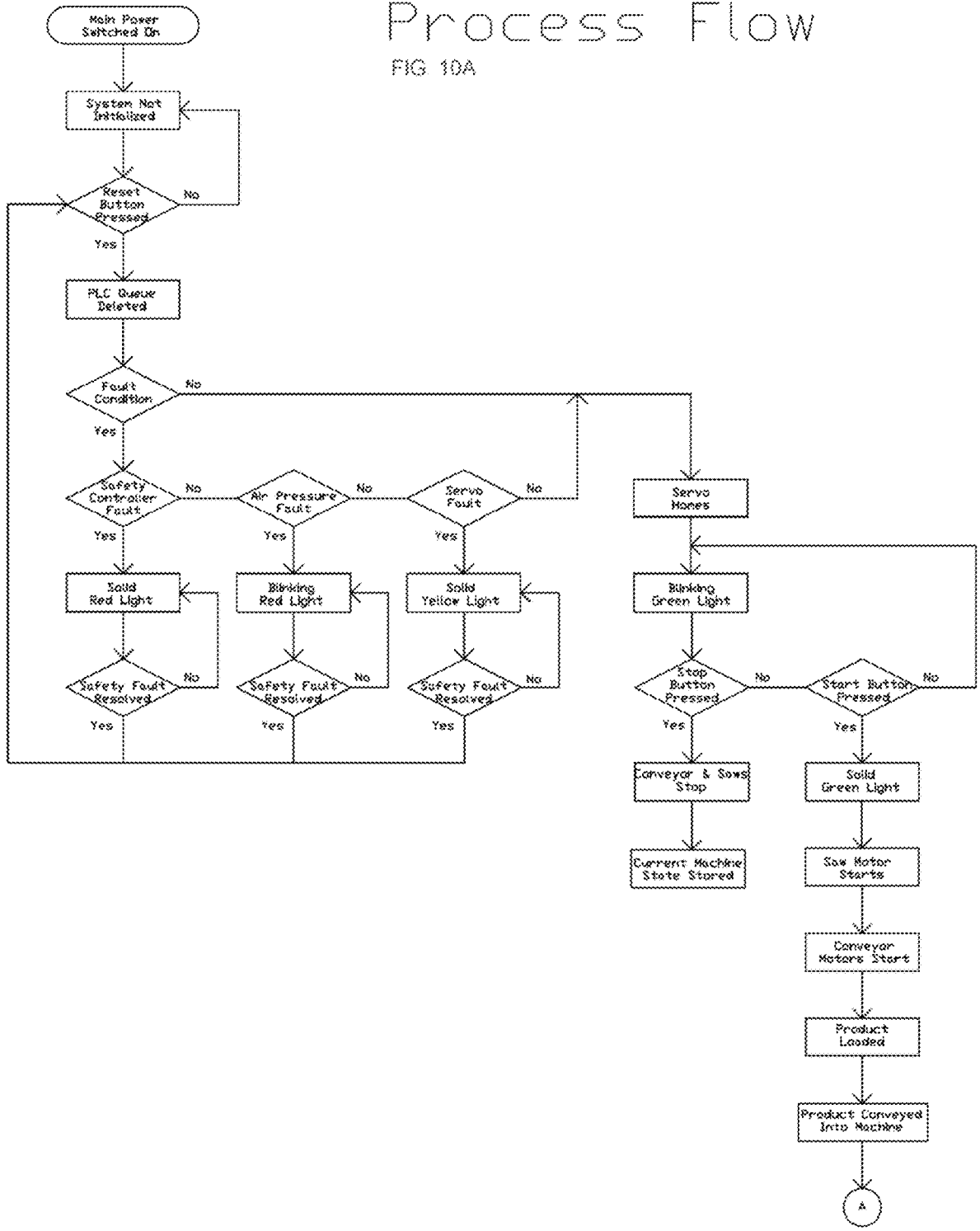

Process Flow

Process Flow

Process Flow

Process Flow

Process Flow

Process Flow

AUTOMATIC CHINE SAW

BACKGROUND

Field

This technology as disclosed herein relates generally to removing bone from primal and sub-primal cuts of meat and, more particularly, to removing the spinal bone structure or other bone structures from a primal or sub-primal cut.

Background

Meat processing operations involve separating a slaughtered animal carcass into its separate primal and sub primal cuts. Typically, animal carcasses are cut in half along the back-bone—the animal's vertebral column. The half carcasses are then separated into primal and sub primal cuts. Some sub primal cuts are processed with the bone in and others are processed with the bone out. Several types of bones are removed from primal and sub primal cuts, one of which is the vertebral column. For example, cuts of meat removed from the rib and loin of a slaughtered animal, including beef, pork and lamb, may be fabricated into various bone-in and boneless meat products such as the rib and the loin sub primal cuts. By way of illustration, an important step in the process of producing such a boneless sub primal cut is the separation of the animals' vertebral column (or "chine") from these cuts of meat.

Processing of an animal carcass to produce resulting primal or sub primal meat products suitable for consumption is relatively complex, and can be very labor intensive and time consuming. For example, the process of manually cutting a loin sub primal cut, using a band saw, to remove the vertebral column can require a fair degree of knowledge and experience. Even large scale processing plants often rely on human operators to handle and process individual carcasses. Many aides have been provided to assist these operators and to make the manual process more efficient. For example, power assisted cutting tools may be utilized. Further, some processes, may be automated.

However, for the most part, human operators possess a degree of skill, knowledge and an ability to evaluate each carcass separately and provide correct and consistent cuts in a manner that is difficult to be readily replicated by automated machinery. For example, the chine bones have been separated from the meat product using a manually operated band-saw or similar device. The chining process is difficult, time consuming, labor intensive and can potentially pose some safety challenges. The chining process is highly variable due to variations in the type, size, shape and anatomy of the meat cuts (referred to herein as meat cut "characteristics"). These variations present a challenge to preparing consistent meat cuts with the lowest possible yield loss.

Further, where human operators are utilized, the production line is typically limited by the speed at which its human operators can safely process the carcass. Therefore, automated systems have also been developed to remove bones from primal and sub primal cuts of meat. However, many of the automated systems provide cuts of inconsistent quality because even within a category primal and sub primal cuts, automated systems have provided cuts of inconsistent quality because even within a given category of cut, the geometry from meat cut to meat cut can vary significantly.

One meat cutting process that provides an illustration of the inconsistencies that can result from using an automated system is the removal of the vertebral column (spine or backbone) from a rib sub primal. For example, removing the vertebral column from the rib sub primal from a bovine carcass can result in inconsistent cuts when utilizing an automated system due to the significant variations in size and shape from one cut to the next. Thus, there exists a need in the art area to provide for an automated system and method for cutting meat, particularly deboning a meat product, such as for the rib sub primal deboning example provided.

SUMMARY

One implementation of the technology as disclosed herein includes a system for removing a bone from a primal or sub primal meat cut that includes a conveyance system having a continuous conveyor extending along a path of conveyance from an upstream point at the loading end to a downstream point at the discharge end. The continuous conveyor of the conveyance system includes a pair of opposing support surfaces projecting vertically upward from a first position of the continuous conveyor along the path of conveyance whereby each of the opposing support surfaces of the pair inwardly extend one toward the other, from an upper level downward vertically to a lower level. Each opposing support surface of the pair has a downward slope and each opposing surface of the pair converges at a recessed valley at the lower level. This configuration provides a V-shaped cross-section formed by the opposing support surfaces. For one implementation of the conveyor system, the continuous conveyor can include a plurality of opposing support surface pairs identical to the pair of opposing support surfaces projecting from the first position and each of said plurality of opposing support surface pairs are positioned at a downstream interval from an identical immediately proceeding opposing support surface pair along a conveyor run extending from the upstream point to the downstream point. For one implementation of the technology the plurality of opposing support surface pairs projecting vertically upward are a series of conveyor flights. For one implementation, the continuous conveyor has a drive that is configured with an encoder to track a position of a product being conveyed on the continuous conveyor.

One implementation of the technology can include a guide rail disposed proximately adjacent the continuous conveyor and that extends substantially in parallel with respect to the path of conveyance. In one implementation the guide rail has an angled support surface that is parallel with respect to the most proximate opposing support surface of the pair of opposing support surfaces. One implementation includes a protection cage covering a portion of the continuous conveyor.

One implementation of the automated system includes an overhead conveyance system having an overhead continuous conveyor extending along the path of conveyance vertically above the plurality of opposing support surface pairs. With one implementation, the overhead conveyance system can include a pressure arm having actuators configured to selectively apply a downward vertical pressure on the overhead conveyance system thereby causing the overhead continuous conveyor to exert a downward vertical force on a meat cut. One implementation of the automated system can include a bone sensor having a scanner configured to capture a 3D image of a bone for determining a cut line, and a control system configured to analyze the 3D image of the bone and transmit a control signal configured to control the cut line of a saw. The technology with one implementation includes a controllable saw configured to adjust a saw cut line responsive to the control signal.

The technology as disclosed includes an automated method for removing a bone from a primal or sub primal meat cut that includes conveying a meat cut on a conveyance system having a continuous conveyor extending along a path of conveyance from an upstream point to a downstream point. One implementation of the method includes supporting the meat product on a plurality of opposing support surface pairs projecting vertically upward from the continuous conveyor along the path of conveyance whereby each of the opposing support surfaces of the pair inwardly extend one toward the other, from an upper level downward vertically to a lower level, whereby each opposing support surface of the pair has a downward slope and each opposing surface of the pair converges at a recessed valley at the lower level, and where the plurality of opposing support surface pairs are identical and each of said plurality of opposing support surface pairs are positioned at a downstream interval from an identical immediately proceeding opposing support surface pair along a conveyor run extending from the upstream point to the downstream point. One implementation of the method can also include supporting the meat cut on a guide rail proximately adjacent the continuous conveyor and that extends substantially parallel with respect to the path of conveyance. In one implementation the guide rail has an angled support surface that is parallel with respect to the most proximate opposing support surface of the pair of opposing support surfaces.

One implementation of the method can include contacting the meat cut from above with an overhead conveyance system having an overhead continuous conveyor extending along the path of conveyance and vertically above the plurality of opposing support surface pairs, and urging downward on the meat cut, with a pressure arm by selectively actuating actuators configured to selectively apply a downward vertical pressure on the overhead conveyance system thereby causing the overhead continuous conveyor to exert a downward vertical force.

One implementation of the method includes scanning the meat cut with a scanner configured to capture a 3D image of a bone for determining a cut line, and analyzing the 3D image with a control system and transmitting a control signal configured to control the cut line of a saw. With one implementation the method includes controlling a saw configured to adjust a saw cut line responsive to the control signal. One implementation of the method includes tracking the position of the product being conveyed on the continuous conveyor an encoder configured on the drive to track the position.

One illustration of how the system and method can be used is to cut the spinal channel area (the vertebrae of rib sub-primal) from the meat cut thereby deboning the spinal channel. The system and method as described herein provides a mounting reference to mount the backbone into the V-cradle on the conveyor belt. The meat cut is conveyed with bone down by laying the backbone down in the v-cradle of the conveyor belt. A fixed fence can be utilized to weigh against the split face of the sub and the v-cradle cradles. The meat cut can engage front guard as it is being conveyed and engaged by top conveyor chain of an overhead conveyor system. The product can be conveyed continuous with no predetermined spaced intervals. The meat cut is secured between top chain of the overhead conveyor system and the v-cradle (the pair of opposing support surfaces projecting vertically upward from a first position of the continuous conveyor). A laser scanner or camera scanner or other vision system can be utilized to locate the top channel of the bone. The scanner can determine total length of product and the relationship of the spinal channel to the v-cradle.

The controller calculates the angle of blade movement over the entire length of bone and the angle of the blade as it transcends the length can vary with the angle of bone. In one implementation of the technology the travel of the blade along the cut can be a simple rise over run—straight line cut, however in one implementation the blade can be controlled to vary the cut angle. The controller calculates a custom start point for each meat cut, and a custom end point for each meat cut and angle for each sub-primal meat cut that is fed through. There can be other points calculated between the start point and the end point for the implementation where the blade varies the cut angle. Therefore the scanner can also determine points in between start and end if there is an embodiment where the angle of the blade varies. Once through the saw portion of the process, the bone is separated by dropping off the cradle and meat is then conveyed further for further processing. Some systems run bone side up, and some have individual cradles for each piece where each whole piece fits in a cradle whereas the technology as disclosed herein is bone side down and continuous rather than individual cradles. Alignment is more difficult with other systems. A traditional band saw can be utilized to make the cut. Bone side down provides a simpler and a more reliable and consistent reference for calculating and making the cut. Bone side up systems cause significant inconsistencies in the positioning or angle of the bone. The bone angles are more consistent with bone side down.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIG. 1C is an illustration of the upper conveyor;

FIG. 1D is an illustration of the discharge end of the conveyor revealing the band saw;

FIG. 5 is an illustration of an opposing side view of the automated system without the protective cage—opposite with respect to FIG. 4;

FIG. 9 is a bottom view of the automated system;

FIG. 10A is an illustration of a portion of the process flow;

Figure 1A:
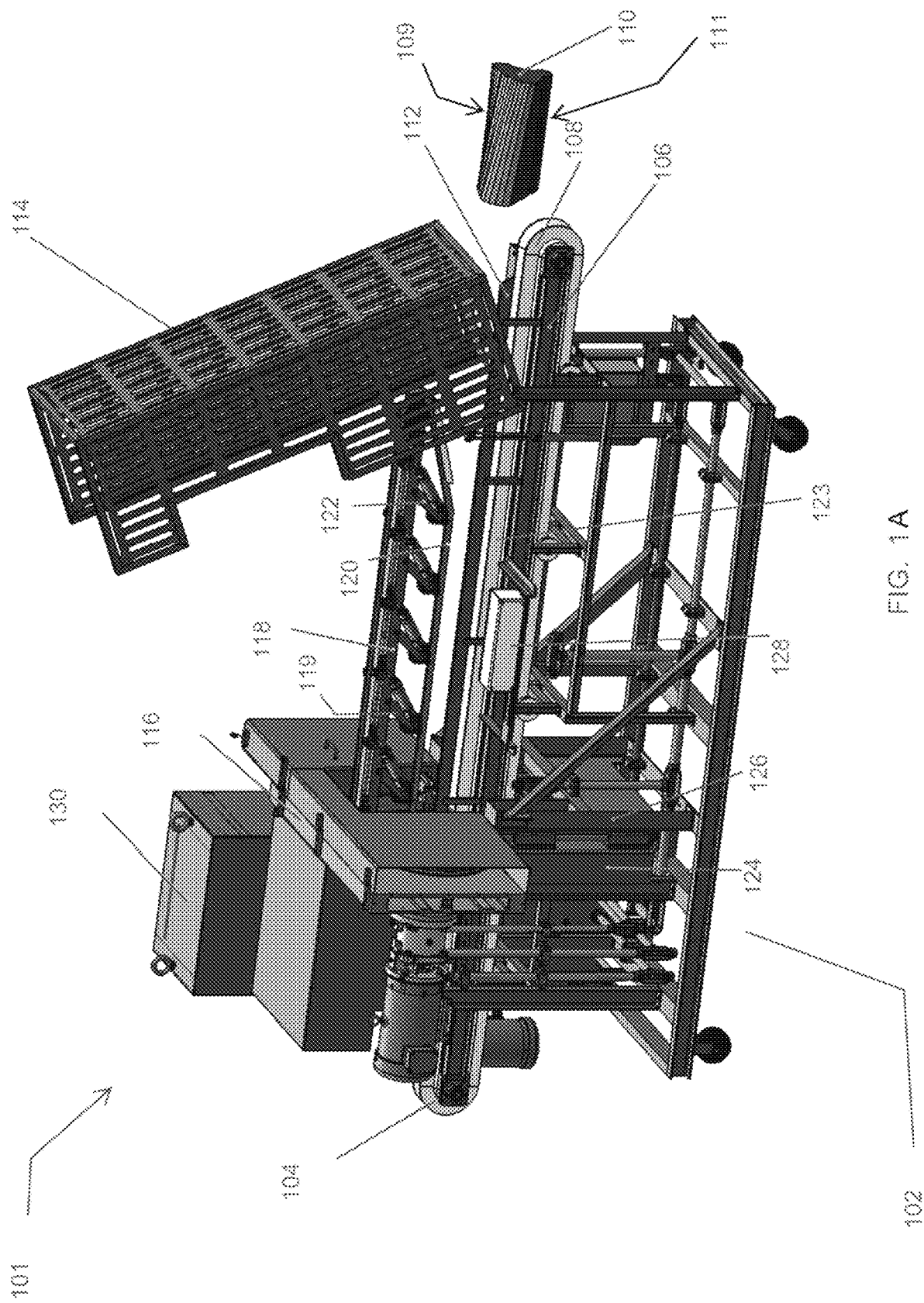
FIG. 1A is an illustration of a side perspective view of the automated system showing the protective cage.
Figure 1B:
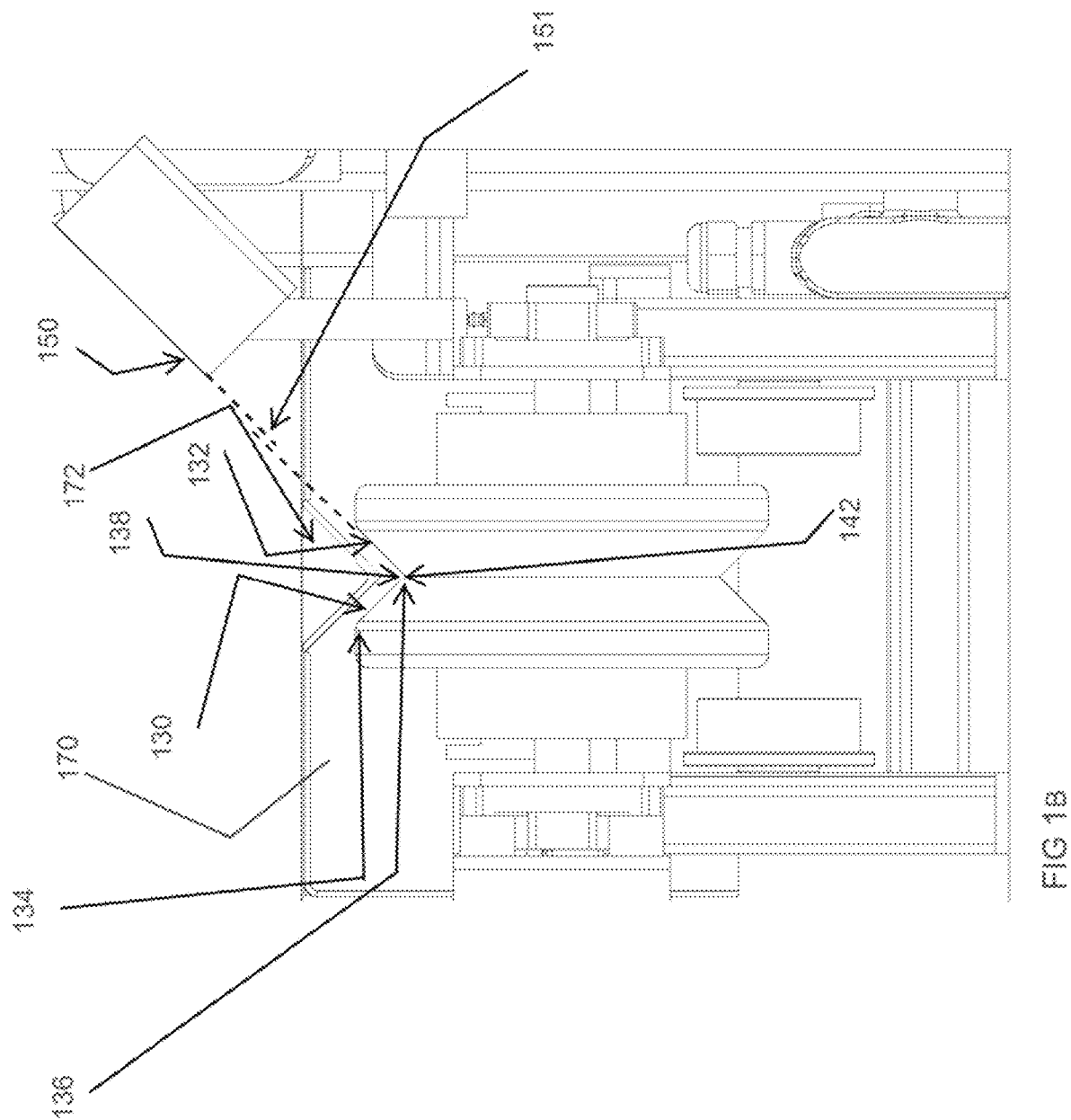
FIG. 1B is an illustration of the discharge end of the V-shaped conveyor.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-10 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

One implementation of the present technology as disclosed includes a conveyance system having a continuous conveyor extending along a path of conveyance from an upstream point at the loading end to a downstream point at the discharge end. The system includes a pair of opposing support surfaces projecting vertically upward from a first position of the continuous conveyor along the path of conveyance whereby each of the opposing support surfaces of the pair inwardly extend one toward the other, from an upper level downward vertically to a lower level. Each opposing support surface of the pair has a downward slope and each opposing surface of the pair converges at a recessed valley at the lower level. The system and method as disclosed and claimed teaches a novel system and method for removing a bone from a primal or sub primal meat cut.

The details of the technology as disclosed and various implementations can be better understood by referring to the figures of the drawing. Referring to FIGS. 1A, 1B, 1C, 1D and 1E, a side perspective view of an automated system 101 for removing a bone from a primal or sub primal meat cut 110 is illustrated. An automated system 101 for removing a bone from a primal or sub primal meat cut 110 is illustrated as including a conveyance system 106 having a continuous conveyor 123 extending along a path of conveyance 133 from an upstream point 108 to a downstream point 104. One implementation of the continuous endless conveyor 123 can include a pair of opposing support surfaces 130 and 132 projecting vertically upward at an angle with respect to horizontal from a first position 142 of the continuous conveyor 106 along the path of conveyance whereby each of the opposing support surfaces of the pair inwardly extend one toward the other, from an upper level 134 downward vertically to a lower level 136, whereby each opposing support surface, 130 and 132, of the pair has a downward slope and each opposing surface of the pair converges at a recessed valley 138 at the lower level. For one implementation of the technology, the recessed valley 138 and the opposing support surfaces 130 and 132 extend along the entire length of continuous endless conveyor. In another implementation, as seen in FIG. 1E, the conveyor is a continuous endless conveyor belt having a plurality of perpendicularly extending flight members 170 having a plurality of spaced apart opposing support surface pairs, 172 and 174, projecting from the first position 176 and each of said plurality of opposing support surface pairs of each perpendicularly extending flight is positioned at a downstream interval from an identical immediately proceeding opposing support surface pair of an identical perpendicularly extending flight along a conveyor run extending from the upstream point 108 to the downstream point 104. Each flight member has a recessed valley area 176, and each of the opposing support surfaces of the pair inwardly extend one toward the other, from an upper level 178 downward to a lower level 176, whereby each opposing support surface, 172 and 174, of the pair has a slope and each opposing surface of the pair converges at a recessed valley 176 at the lower level. In one implementation of the plurality of flight members 170, the flight members are equally spaced apart along the entire length of a continuous endless conveyor. The repetitive spaced apart flight members accomplish the function of the continuous conveyor having opposing support surfaces shown in FIGS. 1A through 1D.

One implementation of the technology can include a guide rail 112 proximately adjacent the continuous conveyor 106 and that extends substantially parallel with respect to the path of conveyance. In one implementation of the technology, the guide rail has an angled support surface 150 that is parallel with respect to the most proximate opposing support surface 132 (proximate opposing support surface 174 in the case of the flight member 170 implementation) of the pair of opposing support surfaces. One implementation includes a protection cage 114 covering a portion of the continuous conveyor.

A sub primal meat cut 110 can be mounted on a conveyance system 104 with bone side 111 down (waste piece) with fat/meat 109 on top (finished piece). In the case of a rib sub primal both the LH and RH meat cut 110 are placed so that the feather-bones contact the guide rail 112 and the spine channel is facing the vision scanner side. One implementation of the guide rail 112 has a fixed plate, which provides an angled support surface 150 that runs through the automated system from load end 108 to the discharge end 104. The fixed plate of the guide rail is angled so that the angled support surface is parallel 151 to angle of the opposing support surface of the V-shape support that is closest to the guide rail on a continuous conveyor. The angled support surface 150 of the guide rail 112 supports the product 110 and automatically sets an angle of the product for the desired cut result.

The continuous conveyor 106 extends along a path of conveyance from an upstream point 108 proximate the load end to a downstream point 104 proximate the discharge end. The continuous conveyor 106, as illustrated in FIG. 1, can be referred to as a V Conveyor Belt given its V-shaped cross section configuration formed by a pair of opposing support surfaces 130 and 132 projecting vertically upward from a first position of the continuous conveyor 106 along the path of conveyance whereby each of the opposing support surfaces of the pair inwardly extend one toward the other, from an upper level 134 downward vertically to a lower level 136, whereby each opposing support surface of the pair has a downward slope and each opposing surface of the pair converges at a recessed valley 138 at the lower level, thereby forming the V-shaped cross section configuration. One implementation of the technology can be a single elongated v-shaped belt where a lateral cross section of the belt has a V-shape. Another implementation is a plurality of repetitive flight members extending perpendicularly from an endless conveyor where each of the flight members has a V-shaped recess. Again, with one implementation of the technology a pair of opposing support surfaces are projecting vertically upward from a first position of the continuous conveyor along the path of conveyance whereby each of the opposing support surfaces of the pair inwardly extend one toward the other, from an upper level downward vertically to a lower level, whereby each opposing support surface of the pair has a downward slope and each opposing surface of the pair converges at a recessed valley at the lower level. In this configuration the opposing surfaces can be a single elongated surface of the V-shaped belt.

However, with one implementation there can be a plurality of perpendicularly extending conveyor flights having opposing support surface pairs identical to the pair of opposing support surfaces projecting from a first position and each of said plurality of opposing support surface pairs positioned at a downstream interval from an identical immediately proceeding opposing support surface pair along a conveyor run extending from the upstream point to the downstream point, where the opposing support surface pairs are a part of each of a plurality of V-shaped flights. Flights in the belt have a V-shape where one side of the V-shaped support surface matches the angle of the guide bar.

The V-shaped belt cradles the chine bone so that it is centered on the lower conveyor and insures the sub-primal does not shift as top pressure is placed on it by an upper spring loaded conveyor that applies a downward vertical force on the product. The angle of V-shaped belt is configured to work in conjunction with angle on Guide Rail to set proper angle for desired cut result. In one implementation of the V-shaped Flights, the flights on belt are spaced at 2" centers in order to act as cleats to drive sub-primal thru machine. In one implementation a continuous belt conveyor provides the lower conveyor assembly. The continuous belt conveyor 144 supports the supports the V-shaped belts.

The primary drive force to move a sub-primal through the machine along the path of conveyance is the lower conveyor system. In one implementation of the technology the conveyor drive can contain an encoder to monitor the progression of the conveyor and thereby the sub-primal position along the path of conveyance and provide timing data for automatic movements and sequences of sawing device. Sub-primal pieces can be placed onto belt on demand with variable spacing between them. There are no dedicated saddles or indexed positions for pieces, which pace or limit speed. The automated system as illustrated with the continuous conveyor has a drive that is configured with an encoder to track a position of a product being conveyed on the continuous conveyor.

Figure 1E:
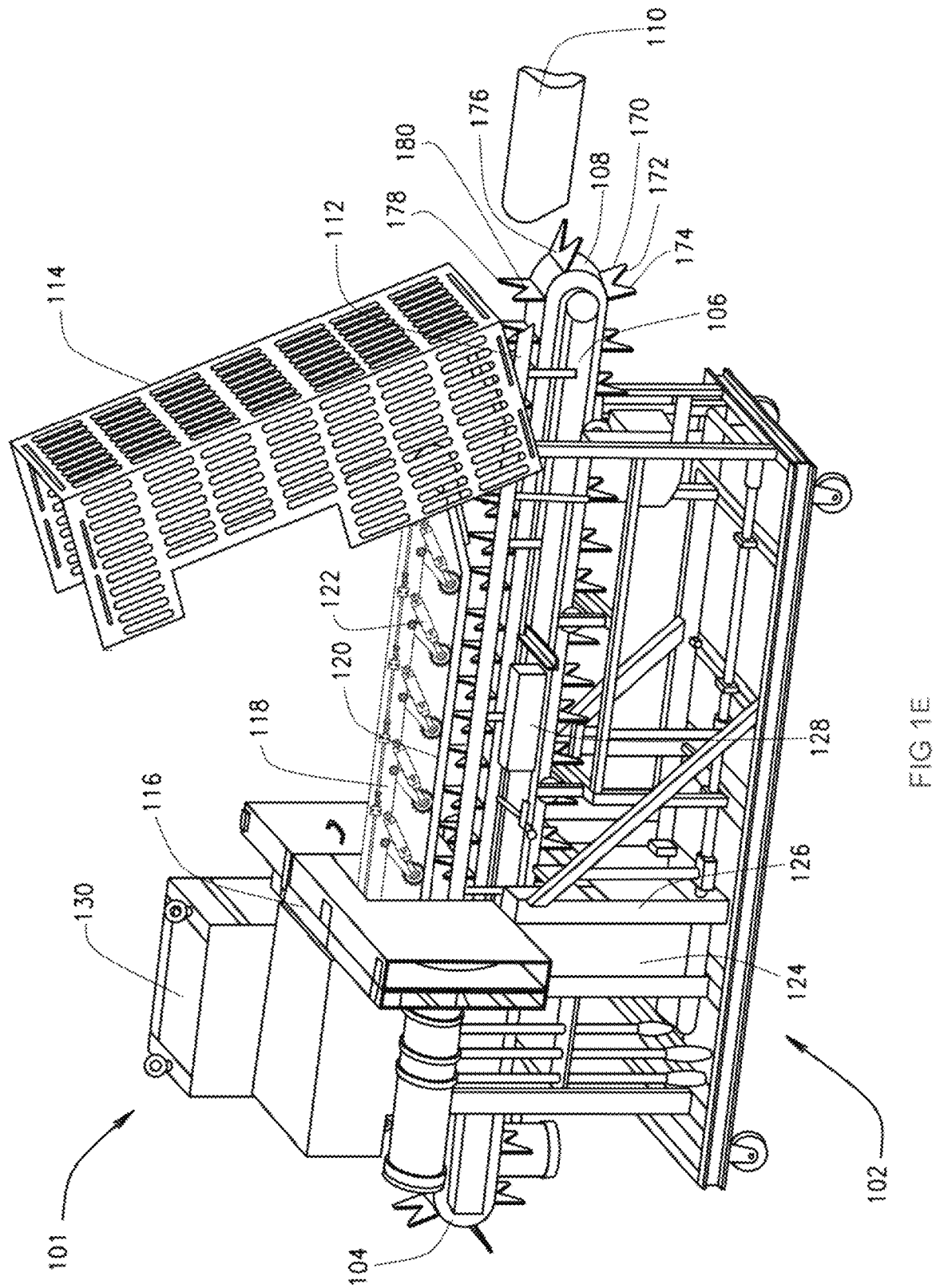
FIG. 1E is an illustration of a side perspective view of the automated system showing the protective cage and an endless conveyor with spaced apart flight members.

One implementation of the automated system as illustrated in FIG. 1A, includes an overhead conveyance system 118 having an overhead continuous conveyor 120 extending along the path of conveyance and substantially parallel with respect to the recessed valley 138 and vertically above the opposing support surface pairs. One implementation of the technology can include a pressure arm 119 having actuators 122 configured to selectively apply a downward vertical pressure on the overhead conveyance system thereby causing the overhead continuous endless conveyor 120 to exert a downward vertical force. One implementation of the pressure arm 119 is a movable arm that provides for vertical movement of the overhead continuous conveyor 120. One implementation of the overhead continuous conveyor is a pressure chain where vertical movement is provided by the movable arm to accommodate sub-primal pieces of varying sized. An Idle sprocket 160 is illustrated that works to guide the pressure chain and to keep running linear to product flow. The actuators 122 are illustrated as air cylinders, which keep constant downward force on moveable arm. Force is adjustable by increasing or decreasing air pressure to the cylinder. The actuation of the cylinders can be selectively controlled by a controller.

The pressure chain, as illustrated in FIGS. 1A and 1C, is configured to span the length of a sub-primal to increase contact area of downward pressure provided from the pressure arms. The current design as illustrated is a roller chain but could be configured with an endless belt or other comparable conveyor means. The pressure conveyor provides drive means for continuous pressure chain conveyance. The overhead conveyance system 118 includes a motor 162, a pressure arm 119, and a continuous pressure chain 120. The overhead conveyance system provides driven top pressure to seat a sub-primal against the guide rail and V-shaped conveyor. The overhead conveyor system can provide a secondary means of conveyance to move sub-primal through the machine.

One implementation of the technology includes a spinal channel sensor positioned along the path of conveyance 133 that provides data regarding the spinal channel attributes. The sensor provides data to a control system regarding spinal channel attributes, position, size and orientation. In one implementation the sensor is an image sensing device such as a digital/video camera, IR sensor, laser, sonographic or other type of image sensing device. Saw 165 movement and cut-path are driven by data output from this sensor that has been processed. FIG. 1D illustrates a fixed saw support frame 167 that supports linear vertical bearing guides for linear bearings on moveable saw support. The saw, as illustrated, is a band saw, however, other types of saws can be implemented.

One implementation of the technology includes a moving saw support that is configured to support a band saw assembly configured to move up and down vertically, thereby moving the cut line up and down. In one implementation of the technology, the saw can vary orientation to vary the cut line with respect to horizontal. The saw can be powered by servo linear actuator. The position of the saw varies the cut line and therefore the path of the cut, which is controlled by data coordinates from the spinal channel sensor. The spinal channel sensor can sense the position and dimensions of the spinal channel or other bone structure and can communicate the information to a controller. The controller will communicate to the saw assembly to control the servo linear actuators to control the position of the saw. The band-saw or other type of saw will cuts along the path of the cut that is predetermined based on the data from spinal channel sensor. The saw assembly 116, as seen in FIG. 1A, includes a motor, a brake, a drive wheel, an idle wheel, and a blade. In one implementation the blade runs horizontally with respect to the plane of the V-conveyor. A controls cabinet houses all of the electrical and pneumatic controls. The cabinet also houses PLC, Servo Drive, Motor Drives, and other electromechanical devices. The PLC in one implementation of the technology is communicably linked to the network. The entire saw assembly can be designed to be manipulated to raise or lower, thereby raising or lowering the saw blade. For one implementation of the technology, the saw assembly is configured to rotate about an axis extending along the path of conveyance in order to vary the angle of the blade about the axis extending along the path of conveyance.

The product discharge area beyond the downstream point 104, as illustrated in FIG. 1A, is where the sub-primal and cut chine bone are separated automatically by gravity as sub-primal will fall away due to reduced shortened length of Guide Rail. The Cut chine bone remains supported within V-Belt cleats and is automatically discharged as it falls off the end of V-belt. A similar action will occur with other meat cuts and bone structures.

With one implementation of the automated system, as illustrated in FIG. 1A, the technology can include a bone sensor vision system 128 having a scanner configured to capture a 3D image of a bone for determining a cut line that can vary to follow the shape, size and contours of the bone structure. A control system having a controller device such as a PLC is configured to analyze the 3D image of the bone and transmit a control signal configured to control the cut line of a saw. In one implementation of the technology a controllable saw is configured to adjust a saw cut line responsive to the control signal.

A vision system 128 is utilized to continuously scan an image of the primal cut as the primal cut passes the vision system as it is conveyed along the path of conveyance. The continuous scan captures a plurality of images of the primal cut including images of the bone area of the primal cut. The varying height of the bone structure is determined from the image. Images of the bone structure is continuously captured over the entire length of the primal cut, which translates to varying heights of the bone structure being determined over the entire length of the primal cut. One implementation of the technology includes capturing 100 or more images of the bone structure for every pre-determined length, which is a portion of the entire length of the bone being scanned. Each image captured translates to a height of the bone structure along this predetermined length. An algorithm is used to determine the average height of the bone structure over the predetermined length. An average height is determined for each interval of the predetermined length along the entire length of the primal cut and corresponding bone structure. The determined height for each interval of a predetermined length will define an interval cut point positioned at the calculated average vertical height above the seat of the conveyor for that interval having the predetermined length. The cut point can be positioned at the beginning of each interval, at the midpoint of each interval or at the end of each interval. In one implementation, the saw is a band saw that vertically adjusts the height of the blade to cut from interval cut point to interval cut point. Therefore the band saw can adjust its vertical height to cut point to point. In one implementation of the technology a smoothing algorithm is used to define a straight or curved cut line based on the various interval cut points.

One implementation of the vision system is to take a scan of the entire primal cut and analyze the image to map the top edge of the bone. An algorithm of the vision system plots an angular straight line extending from the front edge of the primal cut to back end of the primal cut. The path and angle of the straight line from the front end to the back end is a calculation of the average slope based on the height determinations from the scan.

The height of the band saw assembly variably adjusts the vertical height of the blade to perform a custom cut on each primal cut based on the scanned image. The vision system can be photo sensor, IR sensor, laser sensor or combination thereof. The vision system can capture a 2 dimensional or 3 dimensional image. A controller having an algorithm to analyze the image to distinguish the image of the bone from the meat and the bone dimensions, particularly the vertical height of the bone elevation. The algorithm can analyze scans from a continuous series of scans and calculate average bone heights for scans captured over a predetermined length; or can analyze a single scan and calculate an average slope of a line estimating the varying height of the bone structure.

Figure 2:
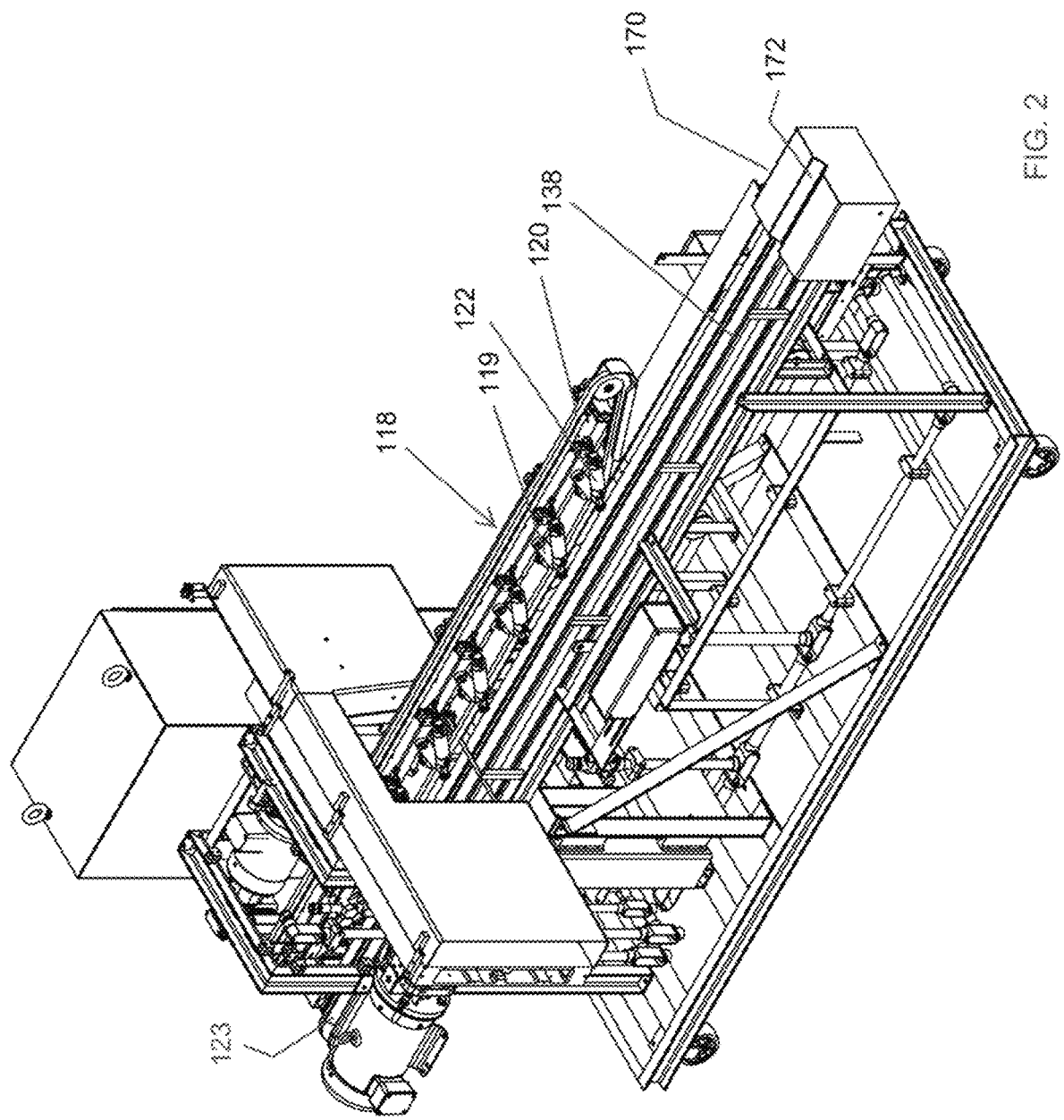
FIG. 2 is an illustration of a side perspective view of the automated system illustrated without the protective cage.

Referring to FIG. 2, a perspective view of the automated system illustrated without the cage assembly. This view as illustrated in FIG. 2, further reveals the overhead conveyance system 118 having an overhead continuous conveyor 120 extending along the path of conveyance and substantially parallel with respect to the recessed valley 138. The pressure arm having actuators are also further illustrated, which is configured to selectively apply a downward vertical pressure on the overhead conveyance system thereby causing the overhead continuous conveyor to exert a downward vertical force. This view further illustrates the pressure arm 119, which is a movable arm that provides for vertical movement of the overhead continuous conveyor 120. The overhead continuous conveyor in this illustration is a pressure chain where vertical movement is provided by the movable are to accommodate sub-primal pieces of varying sized. An Idle sprocket is illustrated that works to guide the pressure chain and to keep running linear to product flow. The actuators 122 are illustrated as air cylinders, which keep constant downward force on moveable arm. The force is adjustable by increasing or decreasing air pressure to cylinder.

The current design as illustrated is a roller chain an endless belt of other conveyance means could be utilized. The pressure conveyor provides a drive means for continuous pressure chain conveyance. The overhead conveyance system includes a motor, a pressure arm, and a continuous pressure chain. The overhead conveyance system provides driven top pressure to seat a sub-primal against the guide rail and the V-shaped conveyor. The overhead conveyor system can provide secondary means of conveyance to move sub-primal through the machine.

FIG. 2 also illustrates an alignment block 170 having a v-shaped recessed groove 172 that matches and is in-line with the v-shaped groove extending along the length of the continuous endless conveyor 123 formed by the opposing sides 130 and 132. Also See FIG. 1A. The alignment block 170 and groove 172 is utilized to align the bone structure prior engaging the endless conveyor 123.

Figure 3:
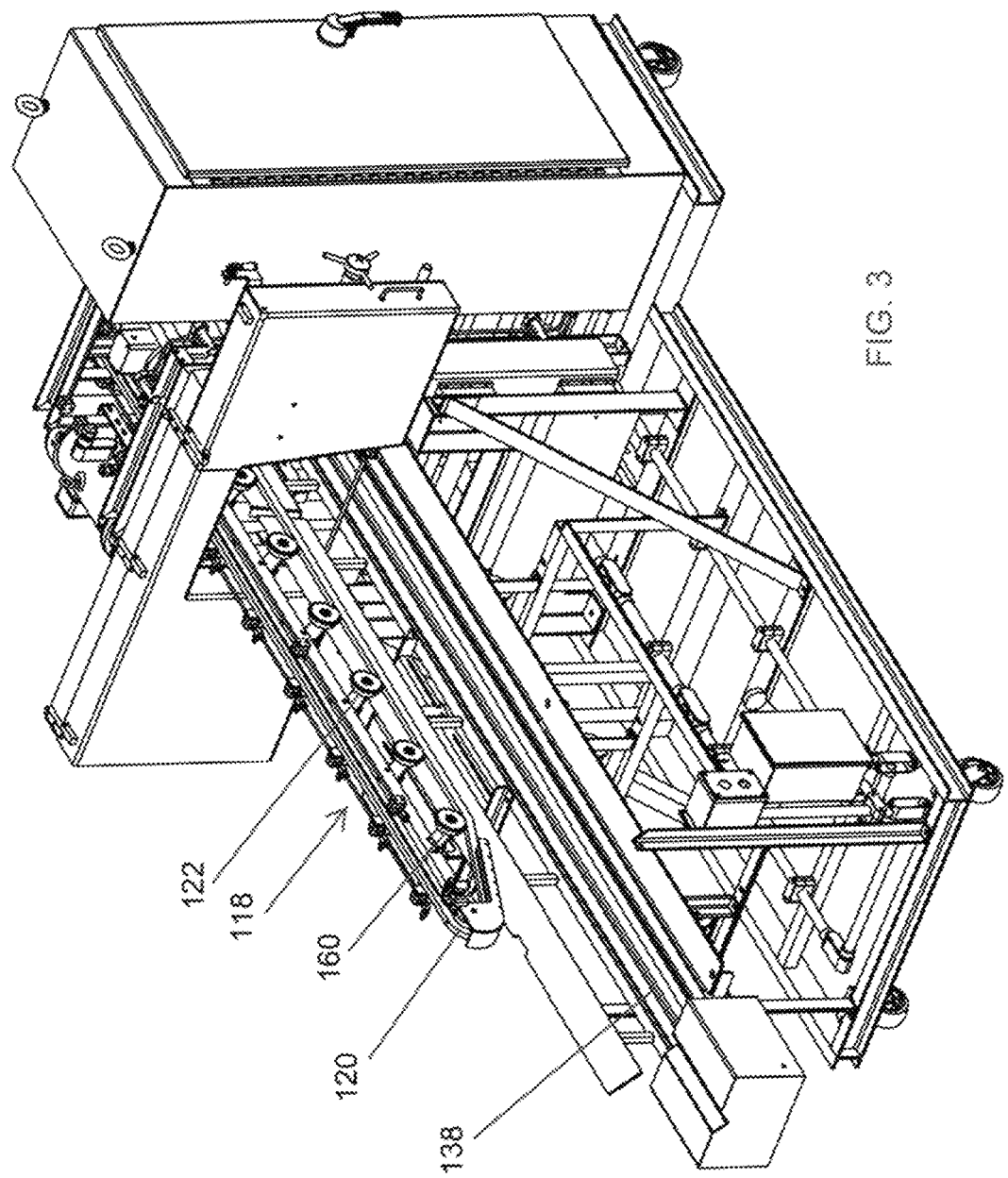
FIG. 3 is an illustration of an opposing side perspective view of the automated system illustrated without the protective cage—opposite with respect to FIG. 2.

Referring to FIG. 3, an opposing side perspective view of the automated system illustrated without the cage assembly. This view as illustrated in FIG. 3, further reveals the opposing side overhead conveyance system 118 having an overhead continuous conveyor 120 extending along the path of conveyance and substantially parallel with respect to the recessed valley 138. The overhead continuous conveyor in this illustration is a pressure chain where vertical movement is provided by the movable are to accommodate sub-primal pieces of varying sized. An Idle sprocket 160 is illustrated that works to guide the pressure chain and to keep running linear to product flow. The actuators 122 are illustrated as air cylinders, which keep constant downward force on moveable arm. The force is adjustable by increasing or decreasing air pressure to cylinder.

Figure 4:
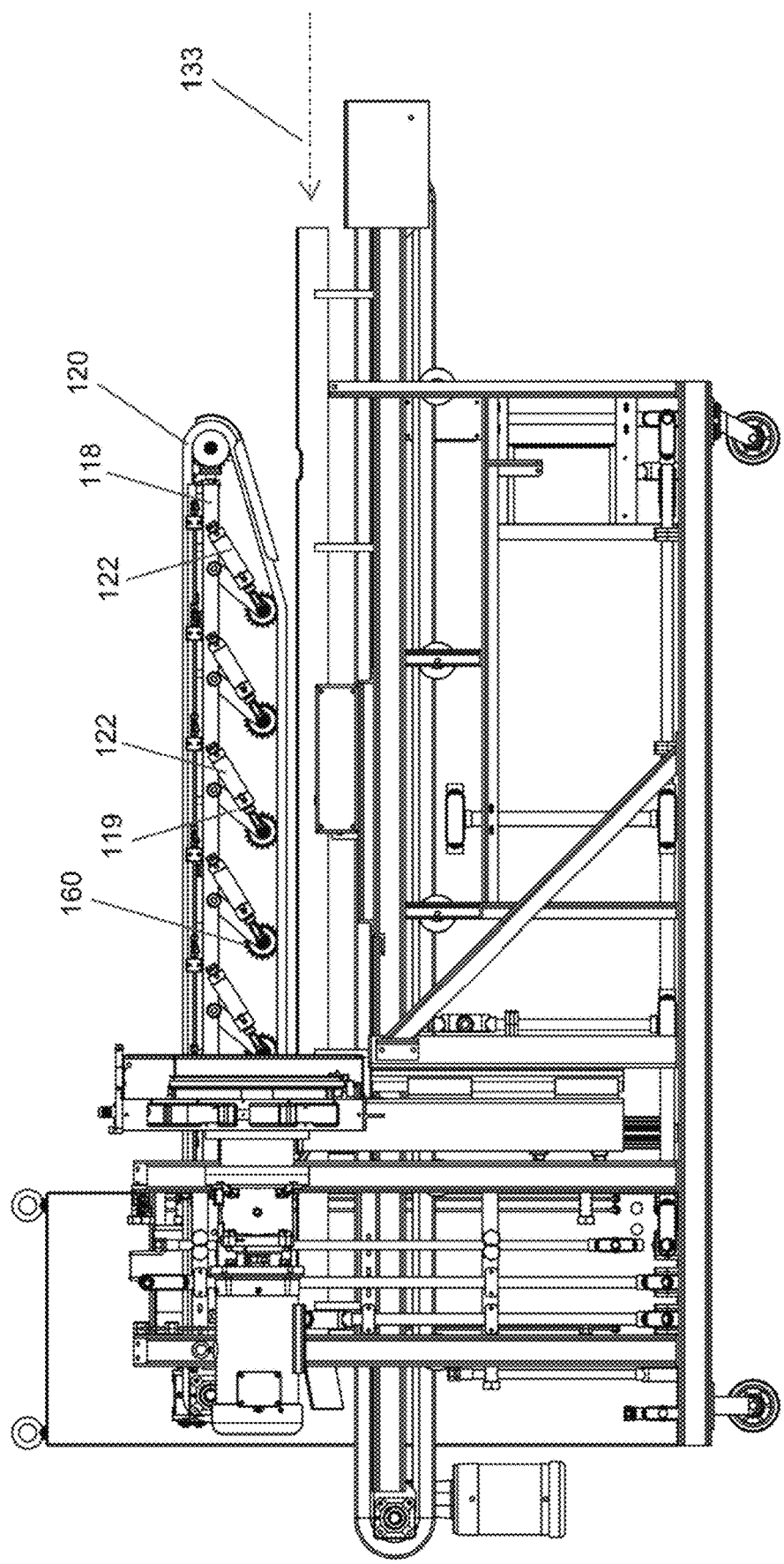
FIG. 4 is an illustration of a side view of the automated system without the protective cage.

Referring to FIG. 4, a side view of the automated system illustrated without the cage assembly. This view as illustrated in FIG. 4, further reveals the overhead conveyance system 118 having an overhead continuous conveyor 120 extending along the path of conveyance and substantially parallel with respect to the recessed valley. The pressure arm 119 having actuators 122 are also further illustrated, which is configured to selectively apply a downward vertical pressure on the overhead conveyance system thereby causing the overhead continuous conveyor to exert a downward vertical force. This view further illustrates the pressure arm 119, which is a movable arm that provides for vertical movement of the overhead continuous conveyor 120. The overhead continuous conveyor in this illustration is a pressure chain where vertical movement is provided by the movable are to accommodate sub-primal pieces of varying sized. An Idle sprocket 160 is illustrated that works to guide the pressure chain and to keep running linear to product flow. The actuators 122 are illustrated as air cylinders, which keep constant downward force on moveable arm. The force is adjustable by increasing or decreasing air pressure to cylinder.

Referring to FIG. 5, an opposing side view of the automated system illustrated without the cage assembly. This view as illustrated in FIG. 5, further reveals the overhead conveyance system 118 having an overhead continuous conveyor 120 extending along the path of conveyance and substantially parallel with respect to the recessed valley. The pressure arm 119 having actuators 122 are also further illustrated, which is configured to selectively apply a downward vertical pressure on the overhead conveyance system thereby causing the overhead continuous conveyor to exert a downward vertical force. This view further illustrates the pressure arm 119, which is a movable arm that provides for vertical movement of the overhead continuous conveyor 120. The overhead continuous conveyor in this illustration is a pressure chain where vertical movement is provided by the movable are to accommodate sub-primal pieces of varying sized. An Idle sprocket 160 is illustrated that works to guide the pressure chain and to keep running linear to product flow. The actuators 122 are illustrated as air cylinders, which keep constant downward force on moveable arm. The force is adjustable by increasing or decreasing air pressure to cylinder.

Figure 7:
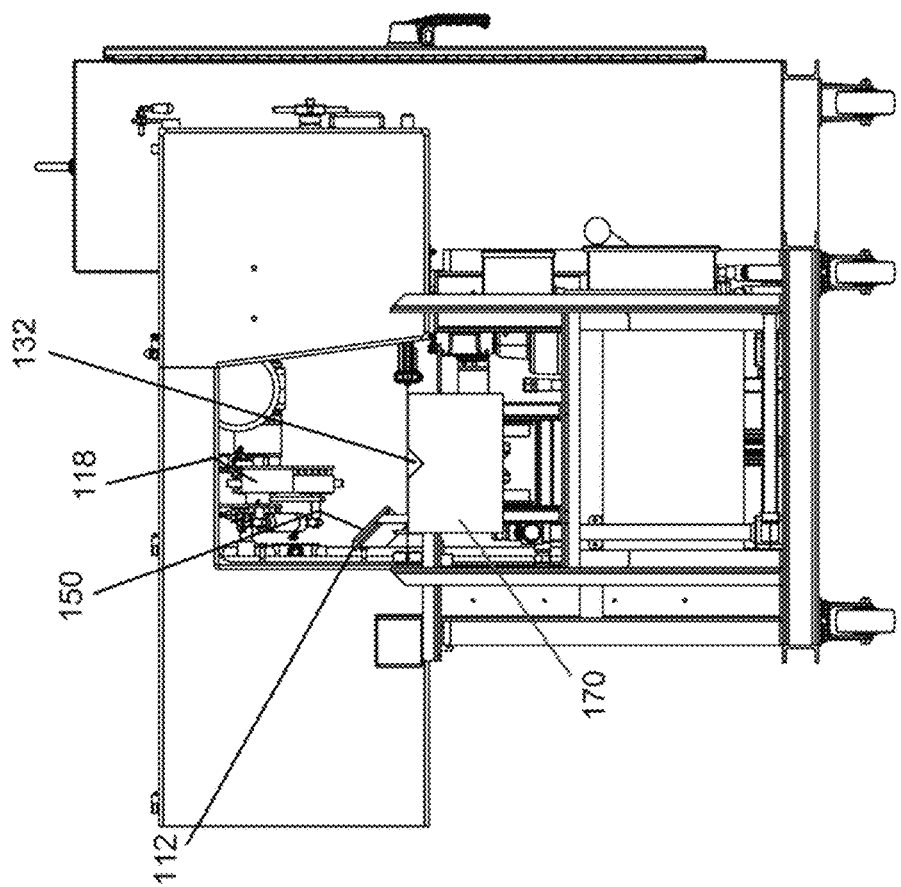
FIG. 7 is a discharge end view of the automated system.

Referring to FIG. 7, a loading end view of the automated system is illustrated. The loading end view of the automated system 101 for removing a bone from a primal or sub primal meat cut further illustrates the conveyance system having the continuous conveyor. One implementation can include a pair of opposing support surfaces and projecting vertically upward from a first position of the continuous conveyor, whereby each of the opposing support surfaces of the pair inwardly extend one toward the other, from an upper level downward vertically to a lower level, whereby each opposing support surface of the pair has a downward slope and each opposing surface of the pair converges at a recessed valley at the lower level. This view also further reveals the guide rail 112 proximately adjacent the continuous conveyor. As can be seen from this view, the surface 150 of the guide rail has an angled support surface that is parallel with respect to the most proximate opposing support surface 132 of the pair of opposing support surfaces. This view also illustrates an alignment block 170 having a v-shaped recessed groove that matches and is in-line with the v-shaped groove extending along the length of the continuous endless conveyor formed by the opposing sides. Also See FIG. 1A. The alignment block 170 and groove is utilized to align the bone structure prior engaging the endless conveyor.

A sub primal meat cut can be mounted on a conveyance system with bone side down (waste piece) with fat/meat on top (finished piece). In the case of a rib sub primal both the LH and RH meat cut are placed so the feather-bones contact the guide rail and the spine channel is facing the vision scanner side. The guide rail has a fixed plate, which provides an angled support surface 150 that runs through the automated system. The fixed plate of the guide rail is angled so that the angled support surface is parallel to angle of the opposing support surface of the V-shaped support surface that is closest to the guide rail on a continuous conveyor. The angled support surface 150 of the guide rail 112 supports the product and automatically sets an angle of the product for desired cut result.

The load end view as illustrated in FIG. 7 also illustrates the overhead conveyance system 118 having an overhead continuous conveyor that is vertically above the opposing support surface pairs 130 and 132. The pressure arm is configured to selectively apply a downward vertical pressure on the overhead conveyance system thereby causing the overhead continuous conveyor to exert a downward vertical force. This configuration provides for vertical movement of the overhead continuous conveyor. The pressure chain is also illustrated in this view where vertical movement is provided by the movable are to accommodate sub-primal pieces of varying sized. The downward force is adjustable by increasing or decreasing an air pressure to cylinder. The overhead conveyance system provides driven top pressure to seat a sub-primal against the guide rail and the V-shaped conveyor.

Figure 6:
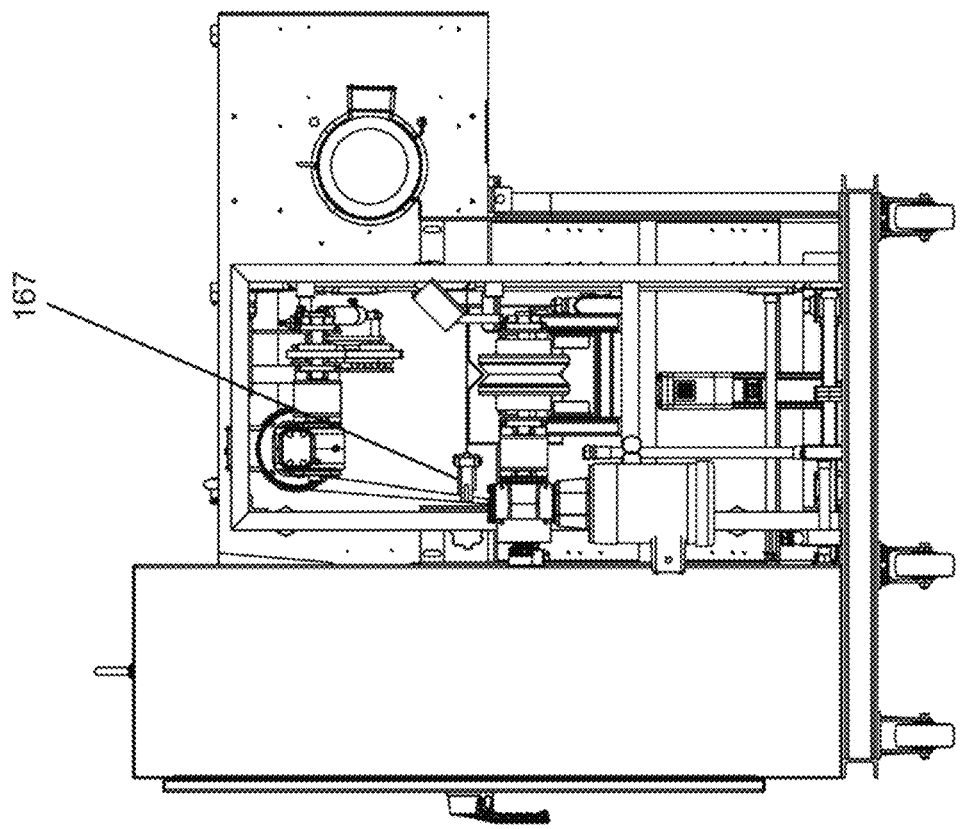
FIG. 6 is a loading end view of the automated system.

Referring to FIG. 6, a discharge end view of the automated system is illustrated. The discharge end view reveals the moving saw support 167 that is configured to support a band saw assembly or other saw assembly configured to move up and down vertically. The saw can be powered by a servo linear actuator. The position of the saw and therefore the path of the cut is controlled by data coordinates from the spinal channel sensor. The band-saw or other type of saw will cut along the path of the cut that is predetermined based on the data from spinal channel sensor. The discharge end view as illustrated in FIG. 6, illustrates the saw, which includes a motor, a brake, a drive wheel, an idle wheel, and a blade. In one implementation the blade runs horizontally with respect to the plane of V-shaped conveyor.

The product discharge area, as illustrated in FIG. 6, is where the sub-primal and cut chine bone are separated automatically by gravity as sub-primal will fall away due to reduced shortened length of Guide Rail. The Cut chine bone remains supported within V-Belt cleats and is automatically discharged as it falls off the end of V-belt.

The technology includes a bone sensor having a scanner configured to capture a 3D image of a bone for determining a cut line. A control system configured to analyze the 3D image of the bone and transmit a control signal configured to control the cut line of a saw. In one implementation of the technology a controllable saw is configured to adjust a saw cut line responsive to the control signal.

Figure 8:
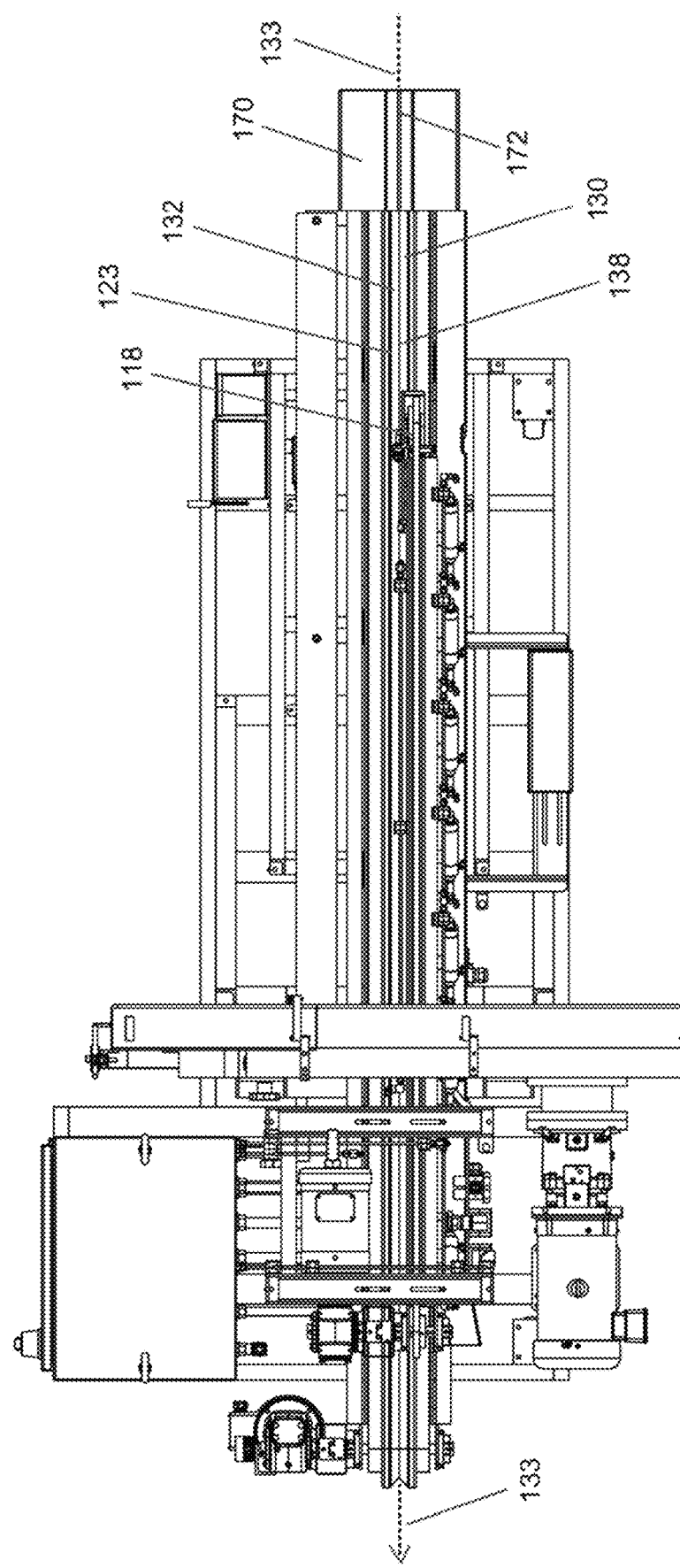
FIG. 8 is a top view of the automated system.
Figure 10B:
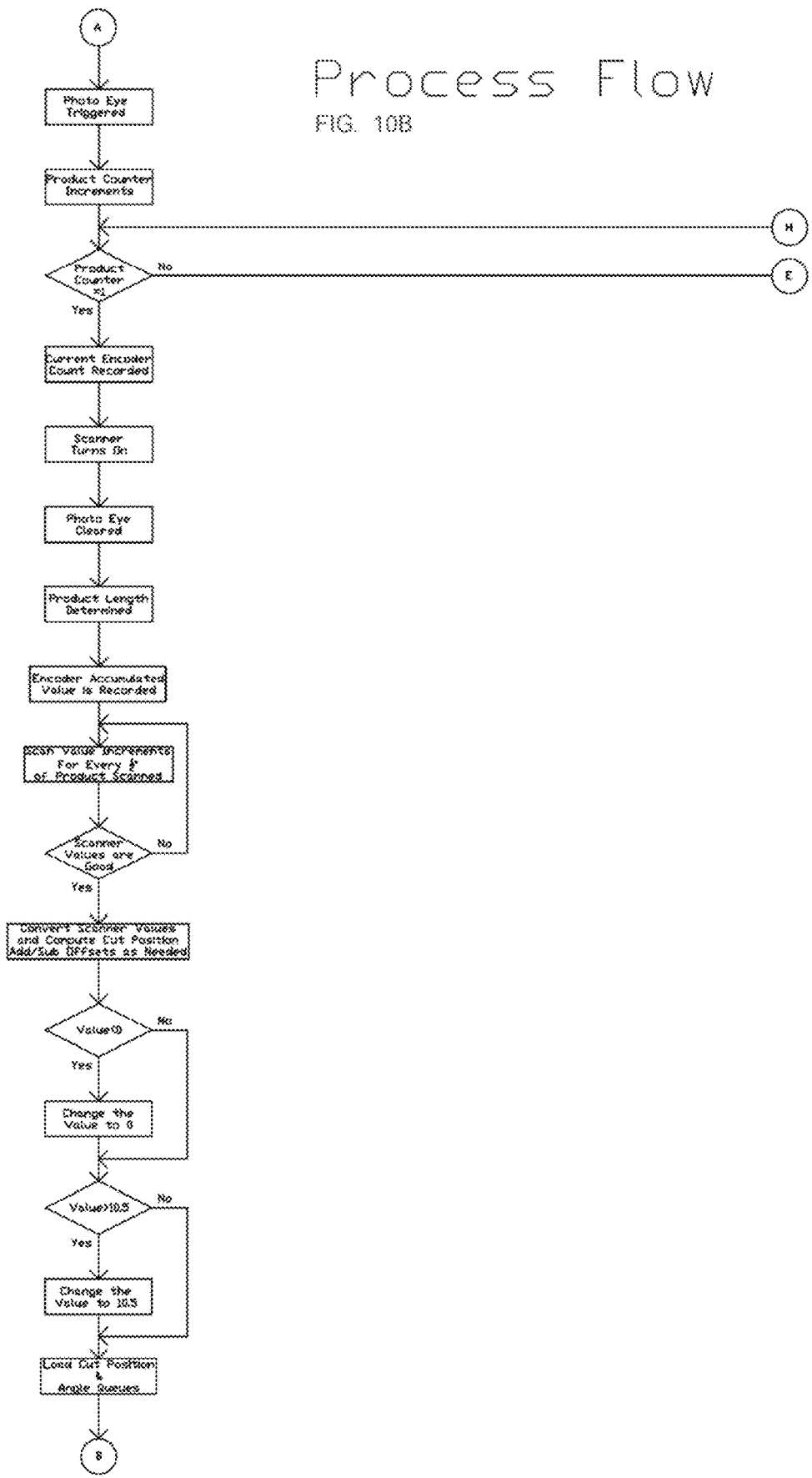
FIG. 10B is another illustration of a portion of the process flow.
Figure 10C:
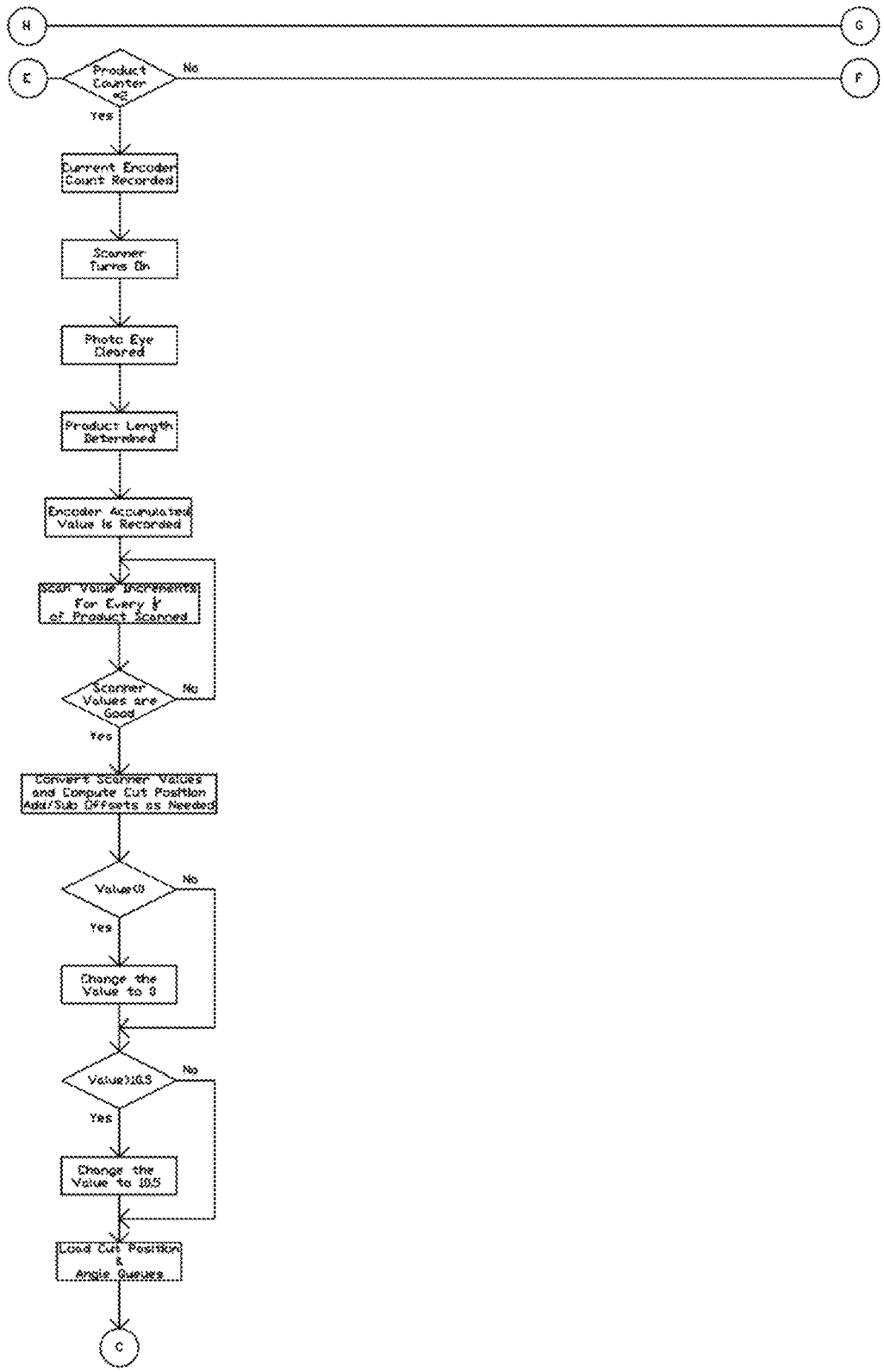
FIG. 10C is another illustration of a portion of the process flow.
Figure 10D:
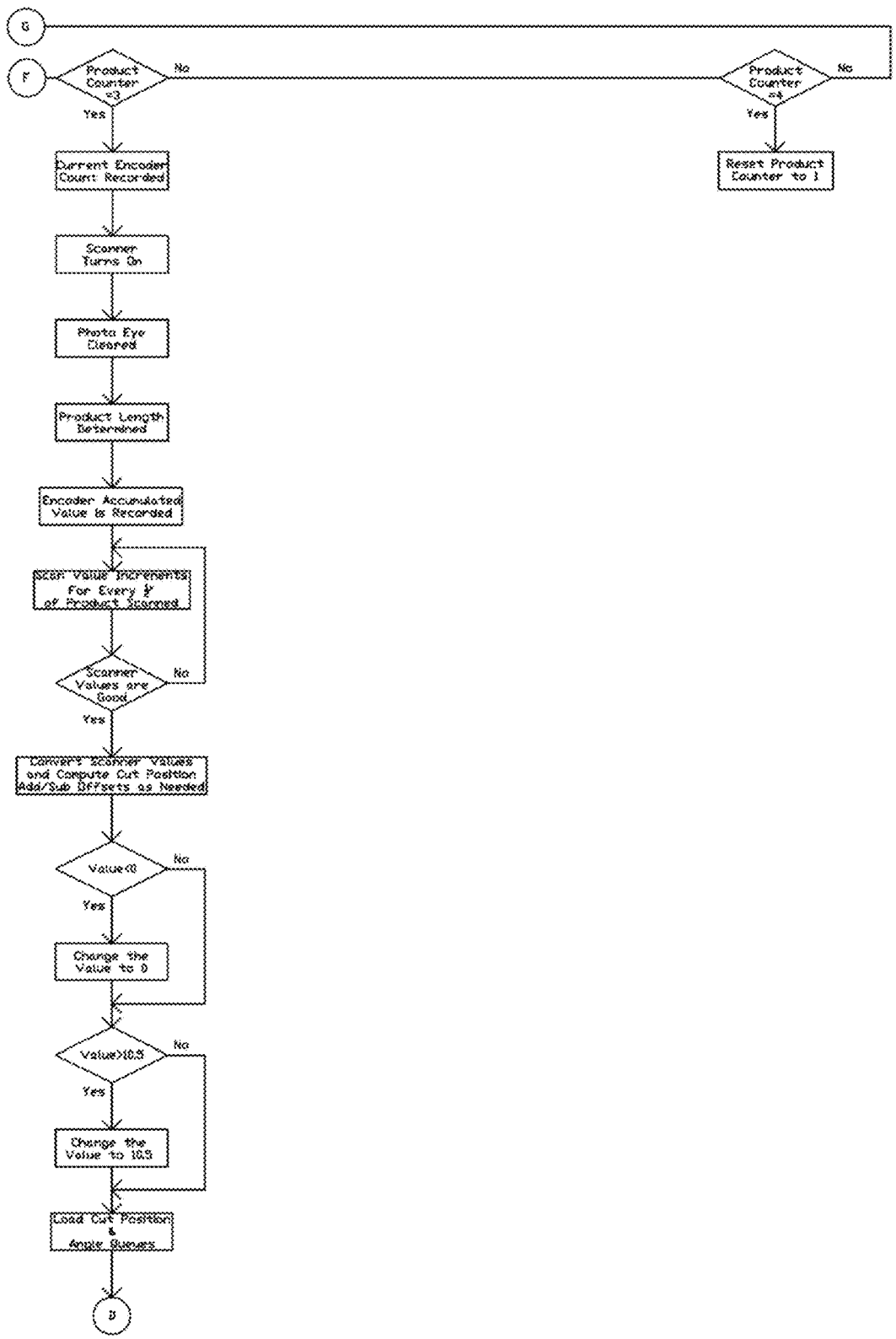
FIG. 10D is another illustration of a portion of the process flow.
Figure 10E:
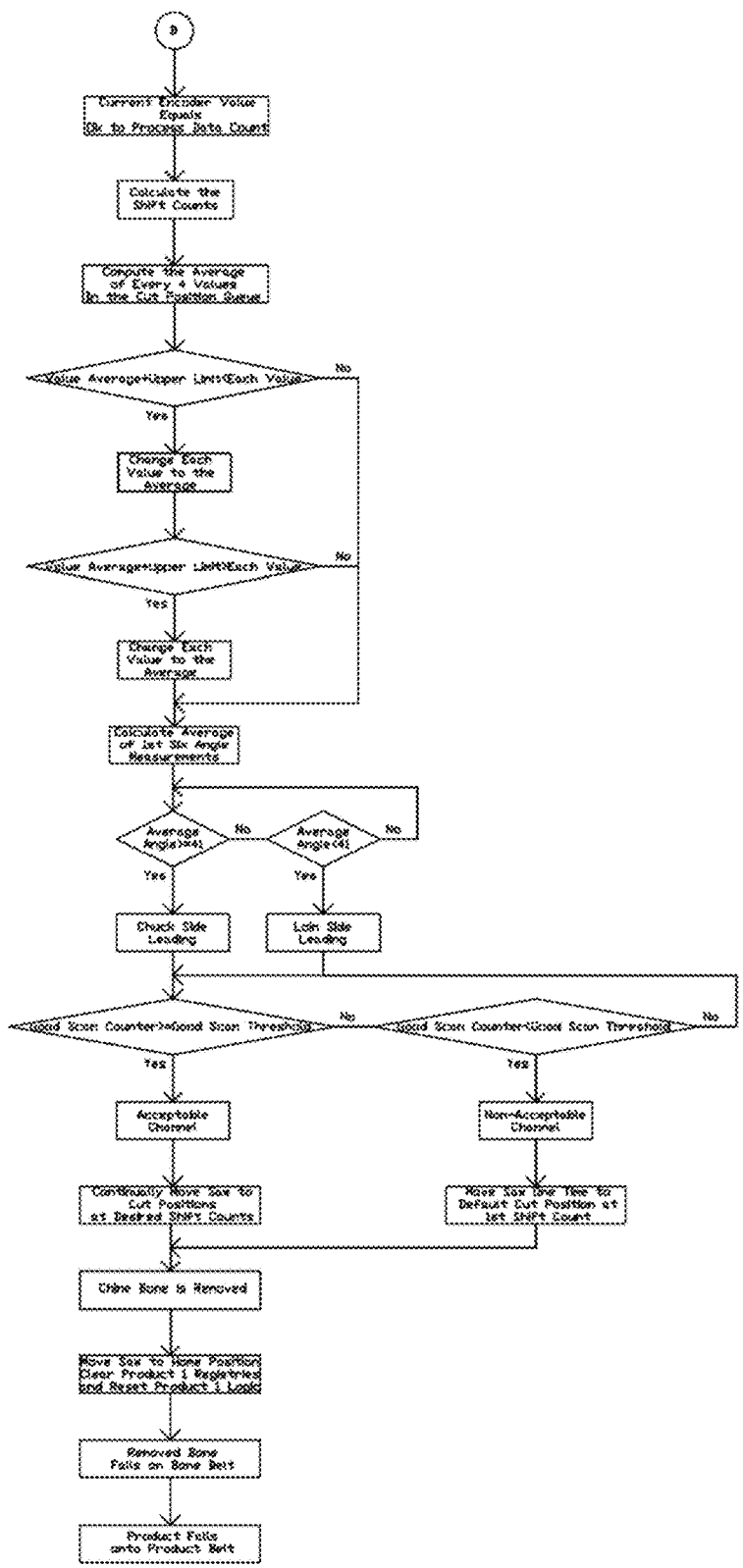
FIG. 10E is another illustration of a portion of the process flow.
Figure 10F:
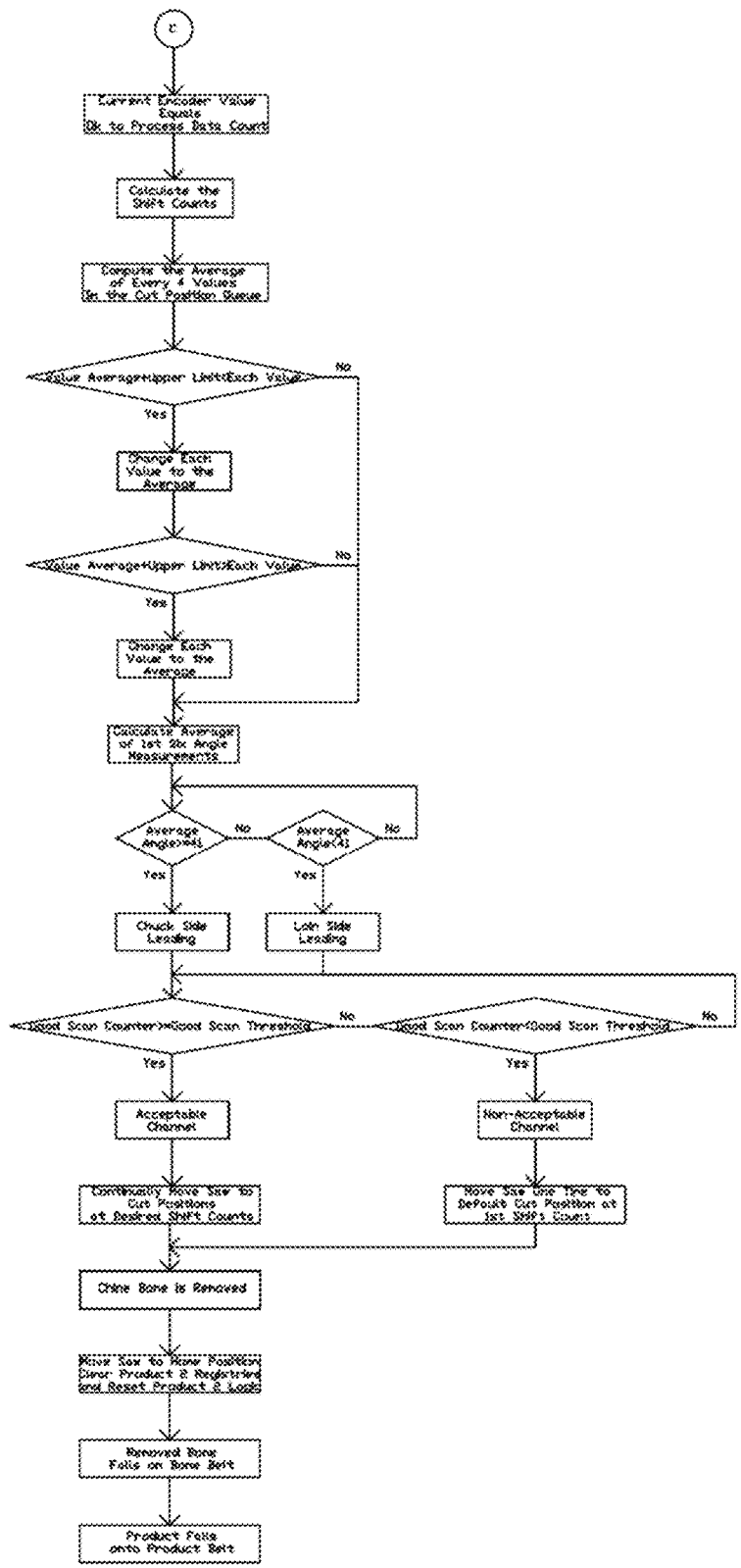
FIG. 10F is another illustration of a portion of the process flow.
Figure 10G:
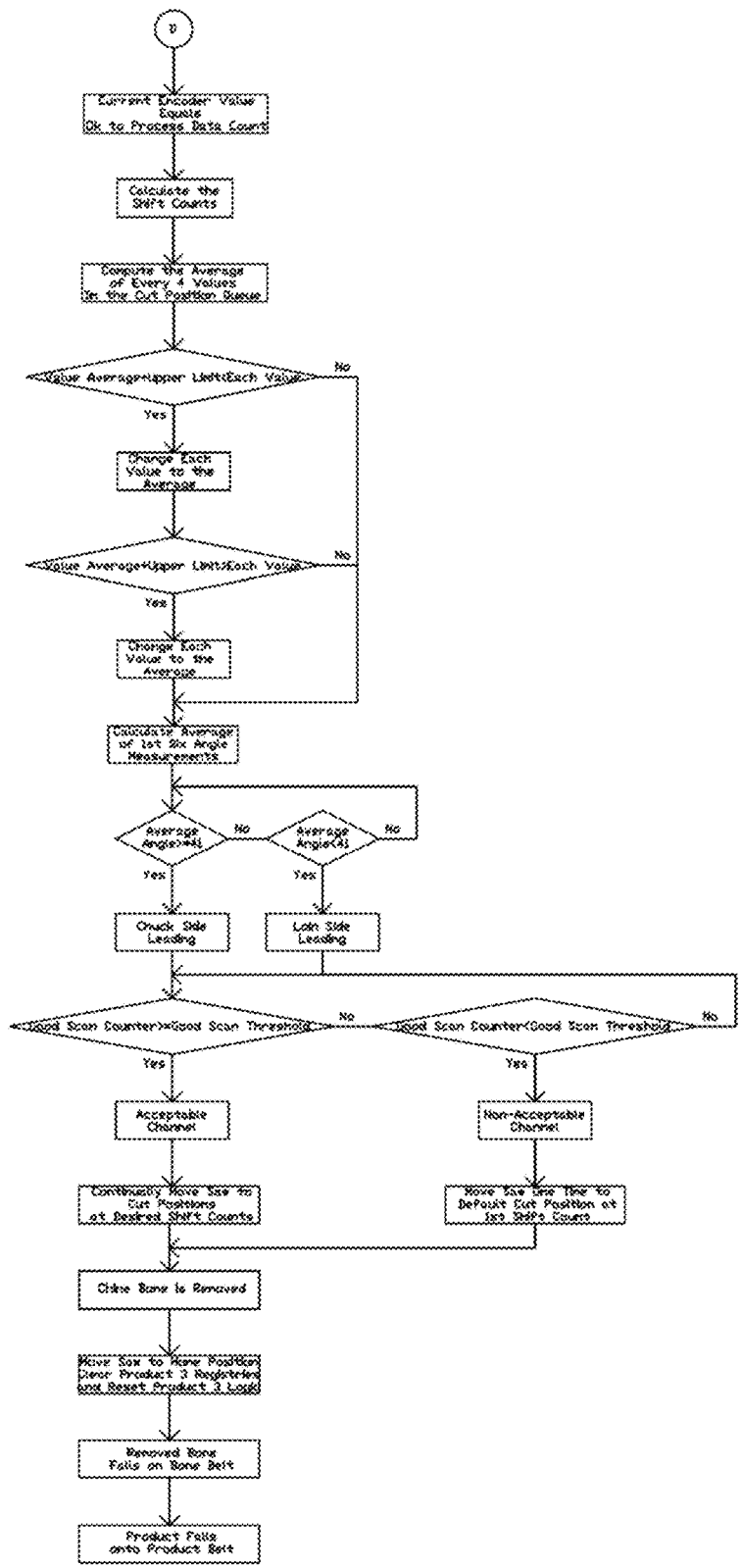
FIG. 10G is another illustration of a portion of the process flow.

Referring to FIG. 8 a top view of the automated system is shown. This view illustrates the alignment block 170 having a v-shaped recessed groove 172 that matches and is in-line with the v-shaped groove extending along the length of the continuous endless conveyor 123 formed by the opposing sides 130 and 132. Also See FIG. 1A. The alignment block 170 and groove 172 is utilized to align the bone structure prior engaging the endless conveyor 123. The overhead conveyance system 118 having an overhead continuous conveyor extending along the path of conveyance 133 and substantially parallel with respect to the recessed valley 138 and aligned above the valley Referring to FIG. 9, a bottom view of the automated system is shown. This view reveals for this implementation, the opposing sides, 130 and 132, and the recessed valley 138 extend along the entire length of the endless conveyor.

Referring to FIGS. 10A through 10G, a flow diagram of the process flow is provided. The system is initialized, including deleting the PLC queue and clearing any fault conditions. The saw is stopped and positioned at its start position. The system is then started and the saw motor and conveyor motor are powered and the saw and conveyor are activated in motion. When the vision system senses that a product is loaded and is being conveyed, the scanner is turned on and the product counter begins incrementing. An encoder count can be initiated to track the distance a loaded product has traveled, which is utilized to determine the length of the product and the bone structure. The encoder value is also utilized to determine the cut point positions along the length of the product. An image of the product is capture and the length of the product length is determined by analyzing the scan. The product is continuously scanned and an average bone height scan value is determined for a plurality of predetermined lengths along the entire length of the product. The vision system determines the leading edge and the trailing edge of the product and uses the encoder values to determine the length of the product. A plurality of cut point positions between the leading edge of the product and the trailing edge of the product are determined at spaced apart intervals. Bone cut point positions are determined for every interval. The images captured by the vision system are analyzed to determine the bone height at each interval, which determines the vertical position of the cut point. The height of the saw is variably adjusted to make the cut between each of the bone cut point positions. One implementation of the system can take an average of a grouping of points and determine an average slope for that grouping. The process can also include the steps of determining whether the product being conveyed is a loin side loading or a chuck side loading by examining the average angle of the determined cut path (cut line). The determined leading edge and trailing edge of the product can be utilized to determine the initial cut position and when the cut has been completed. Once the product cut is complete and the bone has been severed from the product, the bone and final product is separated. The vision system will automatically scan the next product being conveyed and all subsequent products. With the system as described, there is no need to index the product with a specific spacing using indexed cradles on the conveyor system.

The various implementations and examples shown above illustrate a method and system for removing a bone from a primal or sub primal meat cut that includes a conveyance system having a continuous conveyor. A user of the present method and system may choose any of the above implementations, or an equivalent thereof, depending upon the desired application. In this regard, it is recognized that various forms of the subject automated method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules or components. A module or component may be a unit of distinct functionality that may be presented in software, hardware, or combinations thereof. When the functionality of a module is performed in any part through software, the module includes a computer-readable medium. The modules may be regarded as being communicatively coupled. In one implementation of the technology as disclosed and claimed herein, the vision system is communicably coupled to a controller such as a programmable logic controller (PLC). In one implementation, the PLC is controlled by a set of software instructions configured to control the PLC to read and decode data received from the vision system representative of the size and shape of the product being conveyed including the size and shape of the bone structure of the product.

The inventive subject matter may be represented in a variety of different implementations of which there are many possible permutations. By way of illustration, one implementation of the scanning system or sensor for sensing a bone structure's position, size, orientation, shape and contour is implemented with hardware and software. One implementation can include vision system hardware, such as a camera vision system, and a controller such as a PLC having software for analyzing the scanned image to determine the bone position, size and shape for implementing the cut. One implementation includes a numerically controlled band saw assembly including a saw motor and an elevation mechanism for vertically raising and lowering the band saw assembly including raising and lowering the vertical position of the band saw blade to control the cut line. In one implementation the PLC is communicably linked to the band saw assembly to thereby control the elevation mechanism to vary the slope of the cut line to follow the contour of the bone structure.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In one implementation, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. For example, the controller of the present technology in one implementation is communicable on a network whereby a user can program or control the controller from a remote computing system that is also communicable on the network. This is useful for storing historical cut line data to a database configured on the network, where the cut line data can be utilized as part of a learning function to improve the quality of the cut lines. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device. The computer can also be a simple controller unit with PLC software.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

Other aspects, objects and advantages of the present technology as disclosed can be obtained from a study of the drawings, the disclosure and the appended claims.

What is claimed:

1. An automated system for removing a bone from a primal or sub primal meat cut comprising:
a conveyance system having a continuous conveyor extending along a path of conveyance from an upstream point to a downstream point; and
said continuous conveyor having a pair of opposing support surfaces projecting from said continuous conveyor at a first position of the continuous conveyor along the path of conveyance, and each of the opposing support surfaces of the pair inwardly extend one toward the other, from an upper level to a lower level, and each of the opposing support surfaces of the pair has a slope and each of the opposing surfaces of the pair converges at a recessed valley at the lower level.

2. The automated system as recited in claim 1, where the continuous conveyor is an endless conveyor and where the opposing support surfaces and the recessed valley extend along a length of the endless conveyor.

3. The automated system as recited in claim 1, comprising:
a plurality of space apart opposing support surface pairs identical to the pair of opposing support surfaces projecting from the first position and each of said plurality of opposing support surface pairs are positioned at a downstream interval from an identical immediately preceding opposing support surface pair along a conveyor run extending from the upstream point to the downstream point.

4. The automated system as recited in claim 1, comprising:
a guide rail proximately adjacent the continuous conveyor and that extends substantially parallel with respect to the path of conveyance.

5. The automated system as recited in claim 4, where the guide rail has an angled support surface that is parallel with respect to a most proximate opposing support surface of the pair of opposing support surfaces.

6. The automated system as recited in claim 1, comprising:
an overhead conveyance system having an overhead continuous conveyor extending along the path of conveyance and laterally aligned with the recessed valley and vertically above the plurality of opposing support surface pairs.

7. The automated system as recited in claim 6, comprising:
a pressure arm having actuators configured to selectively apply a downward vertical pressure on the overhead conveyance system thereby causing the overhead continuous conveyor to exert a downward vertical force.

8. The automated system as recited in claim 1, comprising:
a bone sensor having a scanner configured to capture an image of a bone for determining a cut line of a saw; and
a control system configured to analyze the image of the bone and transmit a control signal configured to control the cut line of the saw.

9. The automated system as recited in claim 8, comprising:
a controllable saw configured to adjust the saw cut line responsive to the control signal.

10. The automated system as recited in claim 1, comprising:
a protection cage covering a portion of the continuous conveyor.

11. The automated system as recited in claim 1, where the plurality of opposing support surface pairs projecting vertically upward are a series of equally spaced apart conveyor flights.

12. The automated system as recited in claim 1, where the continuous conveyor has a drive that is configured with an encoder to track a position of a product being conveyed on the continuous conveyor.

13. An automated method for removing a bone from a primal or sub primal meat cut comprising:

conveying a meat cut on a conveyance system having a continuous conveyor extending along a path of conveyance from an upstream point to a downstream point; and supporting the meat cut on said continuous conveyor with a pair of opposing support surfaces projecting from said continuous conveyor at a first position of the continuous conveyor along the path of conveyance, and each of the opposing support surfaces of the pair inwardly extend one toward the other, from an upper level to a lower level, and each of the opposing support surfaces of the pair has a slope and each of the opposing surfaces of the pair converges at a recessed valley at the lower level and said convergence at said recessed valley supporting and positioning said meat cut.

14. The automated method as recited in claim 13, where the continuous conveyor is an endless conveyor and where the pair of opposing support surfaces and the recessed valley extend along a length of the endless conveyor.

15. The automated method as recited in claim 13, comprising:

supporting the meat cut on a plurality of space apart opposing support surface pairs identical to the pair of opposing support surfaces projecting from the first position and each of said plurality of opposing support surface pairs are positioned at a downstream interval from an identical immediately preceding opposing support surface pair along a conveyor run extending from the upstream point to the downstream point.

16. The automated method as recited in claim 13, comprising:

supporting the meat cut on a guide rail proximately adjacent the continuous conveyor and that extends substantially parallel with respect to the path of conveyance.

17. The automated method as recited in claim 16, where the guide rail has an angled support surface that is parallel with respect to the most proximate opposing support surface of the pair of opposing support surfaces.

18. The automated method as recited in claim 13, comprising:

contacting the meat cut from above with an overhead conveyance system having an overhead continuous conveyor extending along the path of conveyance and laterally aligned with the recessed valley and vertically above the plurality of opposing support surface pairs.

19. The automated method as recited in claim 18, comprising:

urging downward on the meat cut, with a pressure arm by selectively actuating actuators configured to selectively apply a downward vertical pressure on the overhead conveyance system thereby causing the overhead continuous conveyor to exert a downward vertical force.

20. The automated method as recited in claim 13, comprising:

scanning the meat cut with a scanner configured to capture an image of a bone for determining a cut line of a saw; and analyzing the image with a control system and transmitting a control signal configured to control the cut line of the saw.

21. The automated method as recited in claim 20, comprising:

controlling a saw configured to adjust a saw cut line responsive to the control signal.

22. The automated system as recited in claim 13, comprising:

positioning a protection cage to cover a portion of the continuous conveyor.

23. The automated system as recited in claim 13, where the plurality of opposing support surface pairs projecting are a series of equally spaced apart conveyor flights.

24. The automated system as recited in claim 13, where the continuous conveyor has a drive that is configured with an encoder to track a position of a product being conveyed on the continuous conveyor.

* * * * *